(12) United States Patent
Verdyan et al.

(10) Patent No.: US 12,155,271 B2
(45) Date of Patent: Nov. 26, 2024

(54) ENERGY CONVERSION DEVICE AND RELATED METHODS

(71) Applicant: GIG Energy LLC, Provo, UT (US)

(72) Inventors: Vardan Verdyan, Provo, UT (US); Mnatsakan Verdyan, Ogden, UT (US); Jon Woodward, Mapleton, UT (US); Craig Allan Coad, Coeur d'Alene, ID (US)

(73) Assignee: GIG Energy LLC, Provo, UT (US)

( * ) Notice: Subject to any disclaimer, the term of this patent is extended or adjusted under 35 U.S.C. 154(b) by 227 days.

(21) Appl. No.: 17/441,166

(22) PCT Filed: Mar. 23, 2020

(86) PCT No.: PCT/US2020/024185
§ 371 (c)(1),
(2) Date: Sep. 20, 2021

(87) PCT Pub. No.: WO2020/198127
PCT Pub. Date: Oct. 1, 2020

(65) Prior Publication Data
US 2022/0161621 A1 May 26, 2022

Related U.S. Application Data

(60) Provisional application No. 62/823,141, filed on Mar. 25, 2019.

(51) Int. Cl.
*B60G 13/14* (2006.01)
*F16H 49/00* (2006.01)
(Continued)

(52) U.S. Cl.
CPC ........... *H02K 1/2795* (2022.01); *B60G 13/14* (2013.01); *F16H 49/005* (2013.01); *H02K 7/116* (2013.01);
(Continued)

(58) Field of Classification Search
CPC ............ B60G 13/14; B60G 2200/1424; B60G 2200/144; B60G 3/06; B60G 2202/16;
(Continued)

(56) References Cited

U.S. PATENT DOCUMENTS

| 5,117,141 A | 5/1992 | Hawsey et al. |
| 2006/0028026 A1 | 2/2006 | Shik |

(Continued)

FOREIGN PATENT DOCUMENTS

| CA | 2646031 A1 | 4/2009 |
| CN | 2296596 | 11/1998 |

(Continued)

OTHER PUBLICATIONS

CN104319966A English translation (Year: 2023).*
(Continued)

*Primary Examiner* — Terrance L Kenerly
*Assistant Examiner* — Viswanathan Subramanian
(74) *Attorney, Agent, or Firm* — TraskBritt

(57) ABSTRACT

An energy conversion assembly including an input shaft coupled to a first annular gear through a first direction limiting device configured to allow rotation of the first annular gear in a first direction and substantially inhibit rotation of the first annular gear in a second direction. The input shaft may be coupled to a second annular gear through a second direction limiting device configured to allow rotation of the second annular gear in the second direction and substantially inhibit rotation of the second annular gear in the first direction. The assembly may include a first transmitting gear engaged with the first annular gear, a second transmitting gear engaged with the second annular gear, a conversion gear operatively coupled to the second transmitting gear, and a transmitting shaft coupled to the first transmitting gear and the conversion gear.

14 Claims, 21 Drawing Sheets

(51) Int. Cl.
    *H02K 1/2795* (2022.01)
    *H02K 7/116* (2006.01)
    *H02K 7/18* (2006.01)
    *H02K 16/00* (2006.01)

(52) U.S. Cl.
    CPC ......... *H02K 7/1807* (2013.01); *H02K 7/1853* (2013.01); *H02K 16/005* (2013.01); *B60G 2202/16* (2013.01); *B60G 2202/22* (2013.01); *B60G 2204/1431* (2013.01); *B60G 2204/419* (2013.01); *B60G 2300/50* (2013.01); *B60G 2300/60* (2013.01)

(58) Field of Classification Search
    CPC ........ B60G 2202/22; B60G 2204/1431; B60G 2204/419; B60G 2300/50; B60G 2300/60; B60G 2204/4192; B60G 7/02; H02K 7/116; H02K 7/1807; H02K 7/1853; H02K 16/005; H02K 21/10; H02K 7/07; H02K 7/086; H02K 1/2795; H02K 13/003; F16H 1/22; F16H 1/12; F16H 49/005; H02N 11/002; B60K 6/36
    See application file for complete search history.

(56) References Cited

U.S. PATENT DOCUMENTS

| | | | | |
|---|---|---|---|---|
| 2006/0071577 | A1* | 4/2006 | Takeuchi | ............... H02K 21/14 310/40 MM |
| 2014/0116042 | A1 | 5/2014 | Lo et al. | |
| 2014/0182955 | A1* | 7/2014 | Yoo | ........................ B60G 7/02 180/65.31 |

FOREIGN PATENT DOCUMENTS

| | | | | |
|---|---|---|---|---|
| CN | 101405925 | A | | 4/2009 |
| CN | 102097906 | A | | 6/2011 |
| CN | 102957236 | A | | 3/2013 |
| CN | 103790762 | A | | 5/2014 |
| CN | 104319966 | A | * | 1/2015 ............. H02K 21/22 |
| CN | 105453395 | A | | 3/2016 |
| JP | 2006-320187 | A | | 11/2006 |
| JP | 2007-528463 | A | | 10/2007 |
| JP | 2009-219327 | A | | 9/2009 |
| JP | 2014-169687 | A | | 9/2014 |
| JP | 2014-230442 | A | | 12/2014 |
| JP | 2017-002885 | A | | 1/2017 |
| KR | 20-0326768 | Y1 | | 9/2003 |
| KR | 10-2012-0000189 | A | | 1/2012 |
| KR | 10-2013-0058433 | A | | 6/2013 |
| KR | 10-2013-0130353 | A | | 12/2013 |
| KR | 10-2015-0074266 | A | | 7/2015 |
| KR | 10-2016-0091066 | A | | 8/2016 |
| KR | 10-1687910 | B1 | | 12/2016 |
| KR | 10-2019-0000487 | A | | 1/2019 |
| WO | 00/31859 | A1 | | 6/2000 |
| WO | 2004/094814 | A1 | | 11/2004 |
| WO | 2009/145544 | A2 | | 12/2009 |
| WO | 2013/176407 | A1 | | 11/2013 |
| WO | WO-2017138795 | A1 | * | 8/2017 ............. F01D 11/00 |

OTHER PUBLICATIONS

WO2017138795A1 English translation (Year: 2023).*
WO2013176407A1 English translation (Year: 2023).*
European Search Report for Application No. 20778871.2 dated Nov. 16, 2022, 8 pages.
Chinese Office Action for Application No. 202080024255.5 dated Aug. 23, 2023, 10 pages.
International Search Report for International Application No. PCT/US2020/024185, dated Jul. 17, 2020, 3 pages.
International Written Opinion for International Application No. PCT/US2020/024185, dated Jul. 16, 2020, 5 pages.
Japanese Office Action for Application No. 2021-560233 dated Jan. 23, 2023, 4 pages.
Chinese Office Action for Application No. 202080024255.5 dated Mar. 22, 2024, 28 pages with machine translation.
Japanese Notice of Reasons for Rejection for Application No. 2021-560233 dated Jan. 26, 2024, 4 pages.
Korean Notice of Rejections for Application No. 10-2021-7034320 dated Jul. 12, 2024, 22 pages with machine translation.

* cited by examiner

ENERGY CONVERSION DEVICE AND RELATED METHODS

CROSS-REFERENCE TO RELATED APPLICATIONS

This application is a national phase entry under 35 U.S.C. § 371 of International Patent Application PCT/US2020/024185, filed Mar. 23, 2020, designating the United States of America and published in English as International Patent Publication WO2020/198127 A1 on Oct. 1, 2020, which claims the benefit under Article 8 of the Patent Cooperation Treaty to U.S. Application Ser. No. 62/823,141, filed Mar. 25, 2019.

TECHNICAL FIELD

This disclosure relates generally to energy conversion devices for converting mechanical motion into electrical energy via a generator, and to systems incorporating such devices for various applications.

BACKGROUND

Increasing costs of fossil fuels have increased the search for alternative methods means of obtaining and utilizing energy. Often the alternative methods involve electrical generators configured to harness other types of energy, such as kinetic energy from movement of a medium, and convert the energy into electrical energy. Some examples include windmills that convert kinetic energy from the movement of air into electrical power by rotating the blades of the windmill. Another example includes hydroelectric dams that pass water flowing down through the dam through a turbine while converting the kinetic energy of the moving water into electrical energy.

The increasing cost of fossil fuels used to power internal combustion engine vehicles has also led to the development of hybrid vehicles. Hybrid vehicles are powered by both an internal combustion engine and an electric motor. The electric motor is powered by a battery provided on the vehicle. The internal combustion engine typically provides power to the battery through an electric generator. The generator is mechanically connected to the internal combustion engine and is electrically connected to the battery. Operation of the internal combustion engine rotates the armature of the generator relative to the stator of the generator, which produces electricity that charges the battery. In the operation of a conventional hybrid vehicle, the output of the internal combustion engine is relied on in rotating the armature of the generator to produce the electricity that recharges the vehicle battery.

BRIEF SUMMARY

An embodiment of the present disclosure may include an energy conversion assembly. The assembly may include an input shaft. The assembly may further include a first annular gear coupled to the input shaft through a first direction limiting device. The first direction limiting device may be configured to allow rotation of the first annular gear in a first direction and substantially inhibit rotation of the first annular gear in a second direction. The assembly may also include a second annular gear coupled to the input shaft through a second direction limiting device. The second direction limiting device may be configured to allow rotation of the second annular gear in the second direction and substantially inhibit rotation of the second annular gear in the first direction. The assembly may further include a first transmitting gear engaged with the first annular gear. The assembly may also include a second transmitting gear engaged with the second annular gear. The assembly may further include a conversion gear operatively coupled to the second transmitting gear. The assembly may also include a transmitting shaft coupled to the first transmitting gear and the conversion gear.

Another embodiment of the present disclosure may include a tidal generator. The tidal generator may include a float. The tidal generator may further include a multiplier gear operatively coupled to the float. The tidal generator may also include an input gear operatively engaged with the multiplier gear. The input gear operatively may be coupled to an input shaft. The tidal generator may further include a first annular gear coupled to the input shaft through a first one way bearing. The first one way bearing may be configured to allow rotation of the first annular gear in a first direction and substantially inhibit rotation of the first annular gear in a second direction. The tidal generator may also include a second annular gear coupled to the input shaft through a second one way bearing. The second one way bearing may be configured to allow rotation of the second annular gear in the second direction and substantially inhibit rotation of the second annular gear in the first direction. The tidal generator may further include a first transmitting gear engaged with the first annular gear. The tidal generator may also include a second transmitting gear engaged with the second annular gear. The tidal generator may further include a conversion gear operatively coupled to the second transmitting gear. The tidal generator may also include a transmitting shaft coupled to the first transmitting gear and the conversion gear.

Another embodiment of the present disclosure may include an electric generator. The generator may include an input gear operatively coupled to an input shaft. The generator may further include an oscillating member operatively coupled to the input gear. The generator may also include a first annular gear coupled to the input shaft through a first one way bearing. The first one way bearing may be configured to allow rotation of the first annular gear in a first direction and substantially inhibit rotation of the first annular gear in a second direction. The generator may further include at least one magnet coupled to the first annular gear and configured to rotate with the first annular gear. The generator may also include a second annular gear coupled to the input shaft through a second one way bearing. The second one way bearing may be configured to allow rotation of the second annular gear in the second direction and substantially inhibit rotation of the second annular gear in the first direction. The generator may further include an armature coupled to the second annular gear and configured to rotate with the second annular gear. The generator may also include a first transmitting gear engaged with the first annular gear. The generator may further include a second transmitting gear engaged with the second annular gear. The generator may also include a conversion gear operatively coupled to the second transmitting gear. The generator may further include a transmitting shaft coupled to the first transmitting gear and the conversion gear.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
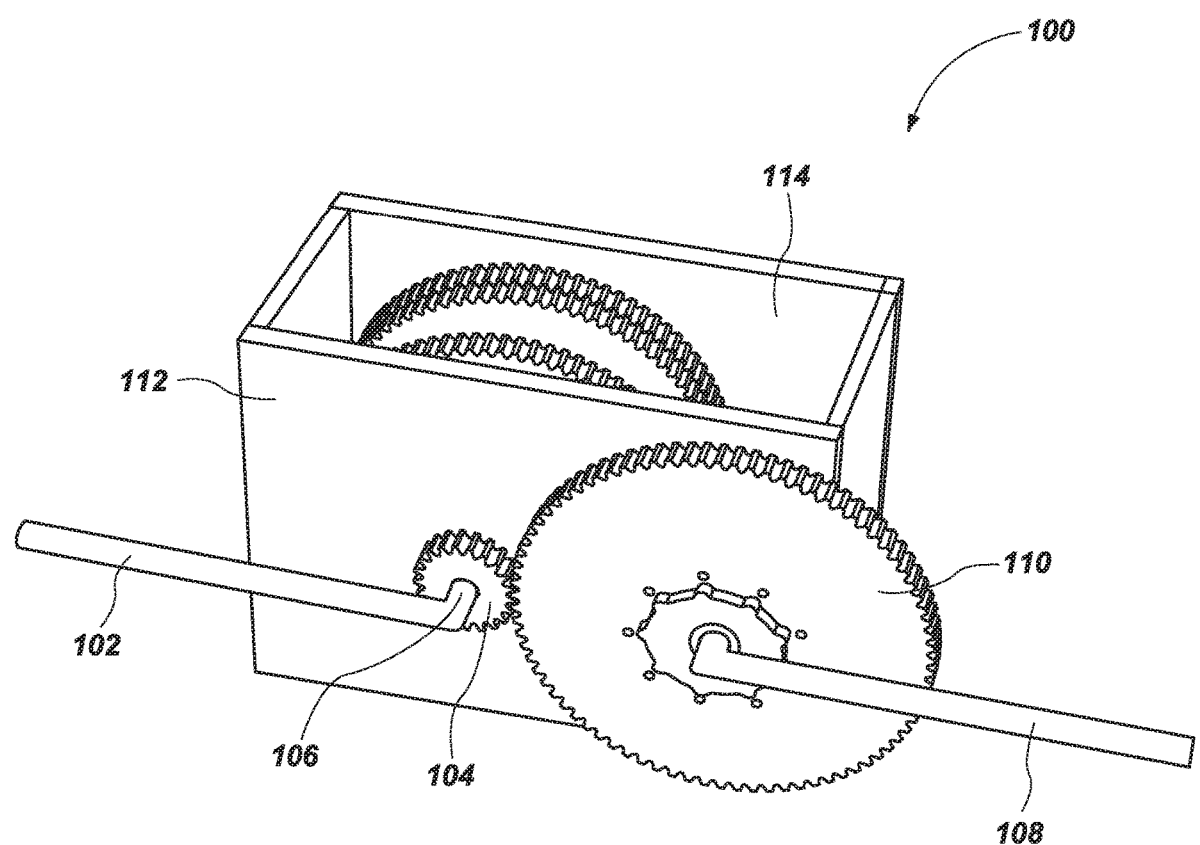
FIG. 1 illustrates a perspective view of an energy conversion apparatus in accordance with an embodiment of the present disclosure.

The illustrations presented herein are not actual views of any particular energy conversion assembly, motor vehicle, wave harnessing assembly, or component of such an assembly, but are merely idealized representations, which are employed to describe the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "front," "back," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As discussed above, increasing costs of fossil fuels have increased the use of alternative methods for converting energy beyond burning fossil fuels. One type of kinetic energy that may be harnessed to convert into electrical energy may be oscillating motion, such as vibrations, waves on a body of water, or movement of a spring system, such as a suspension system.

Embodiments described in the present disclosure include an energy conversion apparatus for converting oscillating motion, such as vibrations experienced by a vehicle (e.g., automobile, car, truck, semi-truck, locomotive, all-terrain vehicle (ATV), utility vehicle (UTV), tractor, etc.) or waves on a body of water (e.g., ocean, sea, lake, pond, river, etc.) into usable energy, such as electrical energy. The embodiments of the present disclosure may convert an oscillating motion into rotation of a single direction. The single direction rotation may rotate an internal generator configured to generate electrical power by rotating magnets relative to a series of coils.

Generating electrical power from mere vibrations may provide advantages over conventional energy conversion devices (e.g., devices that capture energy when vehicles are braking). For instance, the energy conversion device of the present disclosure may allow vehicles to generate power from suspension vibrations that occur anytime the vehicle is moving. The foregoing may reduce extreme cycles on rechargeable batteries and may reduce fuel consumption. Furthermore, some embodiments of the present disclosure may allow the generation of power (e.g., provide renewable energy) directly from the oscillatory motion of waves on a body of water, which may increase the efficiency of tidal generators that convert the energy of the waves multiple times before generating electricity, such as generating hydraulic pressure from the waves that is then used to turn a hydraulic pump to generate electricity.

In some embodiments, the energy conversion device may be attachable to current vehicles not currently using energy conversion devices. For instance, the energy conversion device of the present disclosure may provide a "clamp on" device/solution for most, if not all, vehicles for capturing additional energy and reducing fuel consumption.

FIG. 1 illustrates an energy conversion apparatus 100 according to one or more embodiments of the present disclosure. The energy conversion apparatus 100 may include an input arm 102 operatively coupled to an input gear 104. In some embodiments, the input arm 102 may be coupled to the input gear 104 through an input shaft 106. In other embodiments, the input arm 102 may be coupled to the input gear 104 through an additional gear, such as a multiplier gear 110. For example, as illustrated in FIG. 1, an input arm 108 may be coupled to the multiplier gear 110 and gear teeth of the multiplier gear 110 may engage gear teeth of the input gear 104 such that motion of the input arm 108 is transferred to the input gear 104 through the multiplier gear 110. In some embodiments, the input arm 102 may be coupled to a linear gear that may be operatively engaged with the input gear 104 through an interaction between teeth on the linear gear and the teeth of the input gear 104, such as a rack and pinion engagement.

While FIG. 1 illustrates the energy conversion apparatus 100 with both the input arm 102 and the input arm 108, some embodiments of the energy conversion apparatus 100 may include only one or the other of the input arm 102 and the input arm 108, such that energy is either input into the input gear 104 directly through the input arm 102 or through the input arm 108 by way of the multiplier gear 110.

The input gear 104 may be operatively coupled to the energy conversion apparatus 100 through the input shaft 106. For example, the energy conversion apparatus 100 may include a case 112, and the input shaft 106 may pass through an opening in the case 112. The opening in the case 112 may include a sleeve configured to protect the input shaft 106 and/or to allow free rotation of the input shaft 106. For example, the sleeve may be a bushing or a bearing.

In some embodiments, the energy conversion apparatus 100 may not include the input gear 104. For example, the input arm 102 may be directly coupled to the input shaft 106, such that motion of the input arm 102 may be transmitted directly to the internal components of the energy conversion apparatus 100 through the input shaft 106 without first passing through the input gear 104.

The case 112 may be configured to encapsulate the internal components of the energy conversion apparatus 100 within a cavity 114 defined within the case 112. The case 112 may be configured to protect the internal components from damage. For example, the case 112 may protect the internal components from impact damage, such as impact with adjacent mechanical components or impact with foreign objects such as debris. In some embodiments, the case 112 may be configured to protect the internal components of the energy conversion apparatus 100 from environmental factors, such as moisture, dust, heat, cold, etc. In some embodiments, the case 112 may allow the energy conversion apparatus 100 to be mounted to a structure, such as a frame, a wall, etc., configured to maintain the energy conversion apparatus 100 in a stationary position relative to a moving component.

Figure 2:
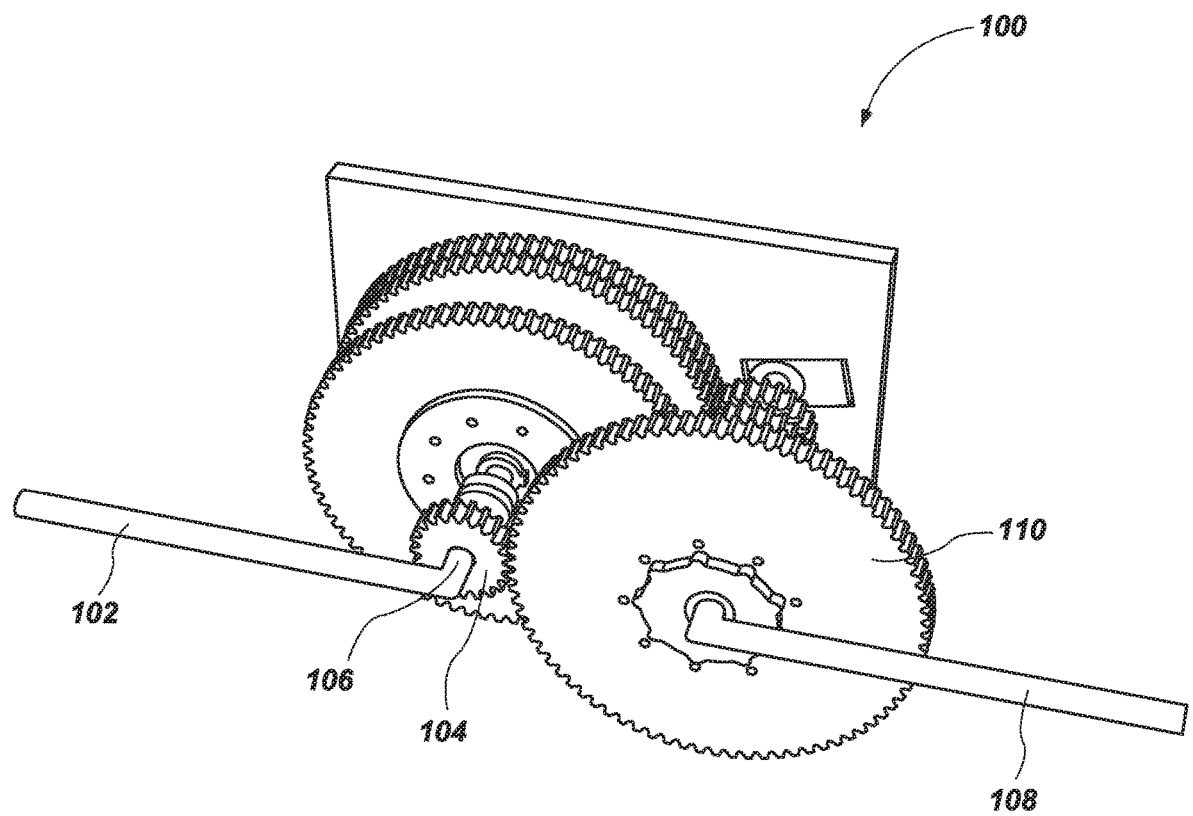
FIG. 2 illustrates another perspective view of the energy conversion apparatus of FIG. 1 in accordance with an embodiment of the present disclosure.

FIG. 2 illustrates the energy conversion apparatus 100 with front and side walls of the case 112 removed to better depict the internal components of the energy conversion apparatus 100. As described above, the input gear 104 may be coupled to the input shaft 106. The input gear 104 and/or input arm 102 may be operatively coupled to one or more annular gears 202, 204, 206 within the energy conversion apparatus 100 through the input shaft 106. For example, the input shaft 106 may be coupled to a first annular gear 202 and a second annular gear 204, such that motion of the input gear 104 and/or the input arm 102 may be transmitted to at least one of the first annular gear 202 and the second annular gear 204. In some embodiments, the input shaft 106 may be operatively coupled to each of the first annular gear 202, the second annular gear 204, and a third annular gear 206. In some embodiments, the first annular gear 202, second annular gear 204, and third annular gear 206 may be coupled together through additional mechanisms, such as gears, gear boxes, hydraulics, cogs, pulleys, belts, etc.

Figure 3:
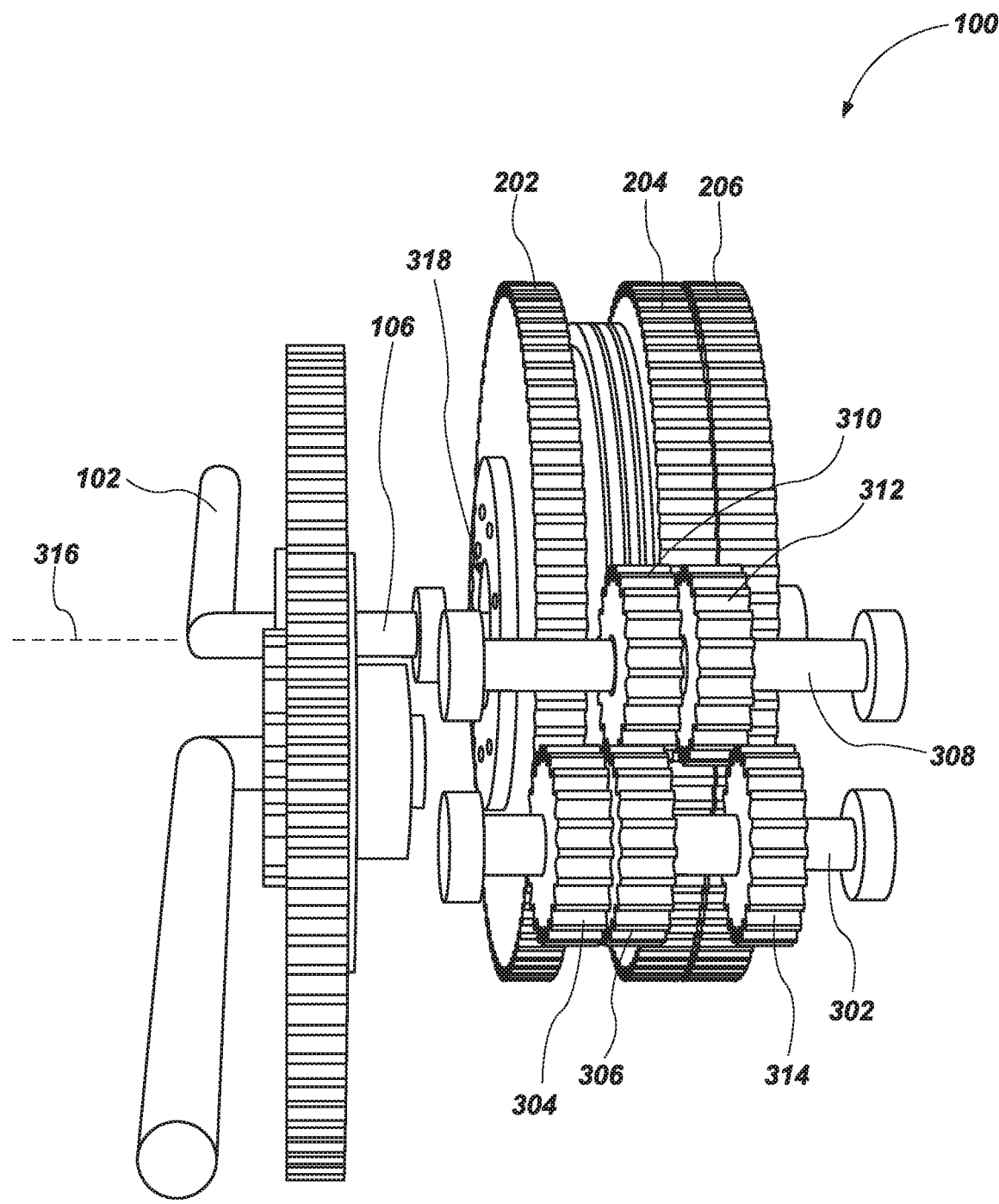
FIG. 3 illustrates another perspective view of the energy conversion apparatus of FIGS. 1 and 2 with covers removed in accordance with an embodiment of the present disclosure.

FIG. 3 illustrates an embodiment of the energy conversion apparatus 100 with the walls of the case 112 removed to better illustrate the internal components of the energy conversion apparatus 100. As described above, the input shaft 106 may be operatively coupled to the first annular gear 202, the second annular gear 204, and the third annular gear 206. In some embodiments, the input shaft 106 may be coupled to the first annular gear 202 such that movement of the input shaft 106 may cause the first annular gear 202 to move (e.g., rotate) in substantially the same direction. For example, if the input arm 102 rotates in a clockwise direction relative to an axis 316 of the input shaft 106, the input arm 102 may cause the input shaft 106 to rotate in a clockwise direction. The input shaft 106 may subsequently cause the first annular gear 202 to rotate in a clockwise direction about the axis 316. In some embodiments, the input shaft 106 may be coupled to the second annular gear 204, such that the input shaft 106 may cause the second annular gear 204 to rotate in substantially the same direction as the input shaft 106.

The coupling between the input shaft 106 and the first annular gear 202 and/or the second annular gear 204 may be configured to only transmit rotational movement from the input shaft 106 to the first annular gear 202 and/or the second annular gear 204 in one direction, while not transmitting rotational movement to the first annular gear 202 and/or the second annular gear 204 in the opposite direction. As a result, when the input shaft 106 is rotated back and forth in a first direction and a second direction, the input shaft 106 may be configured to cause the first annular gear 202 and the second annular gear 204 to rotate relative to one another such that the first annular gear 202 rotates in the first direction and the second annular gear 204 rotates in the second direction. In some embodiments, the limitations on the directions in which the first and second annular gears 202, 204 may rotate may be facilitated by a direction limiting device, such as a one-way bearing (e.g., sprag bearing, sprag clutch, slipper clutch, anti-reverse, etc.). In some embodiments, the direction limitations may facilitated through a design of the annular gear 202, 204, 206 or a drive member coupling the annular gear 202, 204, 206 to the input shaft 106, as described in further detail below with respect to FIG. 13.

The first annular gear 202, the second annular gear 204, and the third annular gear 206 may be linked through another set of gears, such that motion of the first annular gear 202, second annular gear 204, and third annular gear 206 may be transmitted to one another. For example, the energy conversion apparatus 100 may include a first transmitting shaft 302 including a first transmitting gear 304 and a first conversion gear 306. The energy conversion apparatus 100 may further include a second transmitting shaft 308 including a second conversion gear 310 and a second transmitting gear 312. The first transmitting gear 304 may be operatively engaged with the first annular gear 202, such that motion of the first annular gear 202 may be transmitted to the first transmitting gear 304 through the interlocking teeth of the first annular gear 202 and the first transmitting gear 304. The first conversion gear 306 may be coupled to the first transmitting gear 304 through the first transmitting shaft 302 such that the first conversion gear 306 moves at substantially the same rotational speed and direction as the first transmitting gear 304. The second conversion gear 310 may be operatively engaged with the first conversion gear 306 such that motion of the first conversion gear 306 may be transmitted to the second conversion gear 310 through the interlocking teeth of the first conversion gear 306 and the second conversion gear 310. The operative engagement of the first conversion gear 306 and the second conversion gear 310 may cause the second conversion gear 310 to rotate in the opposite rotational direction from the first conversion gear 306. The second conversion gear 310 may be coupled to the second transmitting gear 312 through the second transmitting shaft 308, such that the second transmitting gear 312 moves at substantially the same rotational speed and direction as the second conversion gear 310. The second transmitting gear 312 may be operatively engaged with the second annular gear 204, such that the motion of the second transmitting gear 312 may be transmitted to the second annular gear 204 through the interlocking teeth of the second transmitting gear 312 and the second annular gear 204. The second transmitting gear 312 may cause the second annular gear 204 to rotate in a rotational direction opposite the rotational direction of the first annular gear 202. The first transmitting shaft 302 and second transmitting shaft 308 and the associated gears described may similarly transmit motion of the second annular gear 204 to the first annular gear 202 such that the first annular gear 202 may rotate in a direction opposite the second annular gear 204.

The direction limiting devices 318 coupling the input shaft 106 to the first annular gear 202 and the second annular gear 204 may allow the input shaft 106 to be driving one of the first annular gear 202 and the second annular gear 204 whenever the input shaft 106 is rotating, while enabling the first annular gear 202 to rotate in a first respective direction and the second annular gear 204 to rotate in a second respective direction opposite the first respective direction regardless of the direction the input shaft 106 is rotating. The annular gear 202, 204 that is being driven by the input shaft 106 may transmit the rotation to the associated first transmitting gear 304 or second transmitting gear 312. The first transmitting shaft 302, second transmitting shaft 308, and associated gears 304, 306, 310, 312 may transmit the motion of the annular gear 202, 204 being driven to the annular gear 202, 204 that is not being driven by the input shaft 106, such that the first annular gear 202 and the second annular gear 204 each rotate in the same respective direction regardless of the direction the input shaft 106 is rotating, wherein the respective direction of the first annular gear 202 is opposite the respective direction of the second annular gear 204.

For example, the input shaft 106 may be coupled to the first annular gear 202 and the second annular gear 204 through respective direction limiting devices 318. The direction limiting device 318 associated with the first annular gear 202 may allow the input shaft 106 to rotate the first annular gear 202 in a first direction and may allow the input shaft 106 to rotate relative to the first annular gear 202 in a second direction without causing the first annular gear 202 to rotate in the second direction. Similarly, the direction limiting device 318 associated with the second annular gear 204 may allow the input shaft 106 to rotate the second annular gear 204 in the second direction and may allow the input shaft 106 to rotate relative to the second annular gear 204 in the first direction without causing the second annular gear 204 to rotate in the first direction.

When the input shaft 106 rotates in the first direction the input shaft 106 may cause the first annular gear 202 to rotate in the first direction through the associated direction limiting device 318. The input shaft 106 may rotate relative to the second annular gear 204 without directly imparting rotation on the second annular gear 204. The first annular gear 202 may cause the first transmitting gear 304 to rotate through the operational engagement between the first annular gear 202 and the first transmitting gear 304. The first transmitting gear 304 may cause the first conversion gear 306 to rotate through the first transmitting shaft 302. The first conversion gear 306 may cause the second conversion gear 310 to rotate through the operational engagement between the first conversion gear 306 and the second conversion gear 310. The second conversion gear 310 may cause the second transmitting gear 312 to rotate through the second transmitting shaft 308. As described above, the operational engagement between the first conversion gear 306 and the second conversion gear 310 may effectively reverse the direction of rotation such that the second transmitting shaft 308 rotates in an opposite direction from the first transmitting shaft 302. The second transmitting gear 312 may cause the second annular gear 204 to rotate through the operational engagement between the second transmitting gear 312 and the second annular gear 204. The second annular gear 204 may rotate in a second direction opposite the first direction of the input shaft 106 and the first annular gear 202 due to the direction reversal caused by the operational engagement between the first conversion gear 306 and the second conversion gear 310.

The direction limiting device 318 between the input shaft 106 and the second annular gear 204 may allow the second annular gear 204 to rotate in the second direction while the input shaft 106 is rotating in the first direction. Thus, the input shaft 106 may directly drive the first annular gear 202 in the first direction while indirectly driving the second annular gear 204 in the second direction through the first transmitting shaft 302, the second transmitting shaft 308, and the associated gears 304, 306, 310, 312.

In some cases the input shaft 106 may reverse direction and rotate in the second direction. When the input shaft 106 rotates in the first direction the input shaft 106 may cause the second annular gear 204 to rotate in the second direction through the associated the direction limiting device 318. The input shaft 106 may rotate relative to the first annular gear 202 without directly imparting rotation on the first annular gear 202. The second annular gear 204 may cause the second transmitting gear 312 to rotate through the operational engagement between the second annular gear 204 and the second transmitting gear 312. The second transmitting gear 312 may cause the second conversion gear 310 to rotate through the second transmitting shaft 308. The second conversion gear 310 may cause the first conversion gear 306 to rotate through the operational engagement between the first conversion gear 306 and the second conversion gear 310. The first conversion gear 306 may cause the first transmitting gear 304 to rotate through the first transmitting shaft 302. As described above, the operational engagement between the first conversion gear 306 and the second conversion gear 310 may effectively reverse the direction of rotation such that the first transmitting shaft 302 rotates in an opposite direction from the second transmitting shaft 308. The first transmitting gear 304 may cause the first annular gear 202 to rotate through the operational engagement between the first transmitting gear 304 and the first annular gear 202. The first annular gear 202 may rotate in the first direction opposite the second direction of the input shaft 106 and the second annular gear 204 due to the direction reversal caused by the operational engagement between the first conversion gear 306 and the second conversion gear 310.

The direction limiting device 318 between the input shaft 106 and the first annular gear 202 may allow the first annular gear 202 to rotate in the first direction while the input shaft 106 is rotating in the second direction. Thus, the input shaft 106 may directly drive the second annular gear 204 in the second direction while indirectly driving the first annular gear 202 in the first direction through the second transmitting shaft 308, the first transmitting shaft 302, and the associated gears 304, 306, 310, 312.

In some cases the input shaft 106 may oscillate transitioning repetitively between rotating in the first direction and rotating in the second direction. As described above, the direction limiting devices 318 may allow the first annular gear 202 and the second annular gear 204 to be selectively engaged by the input shaft 106 such that the first annular gear 202 and the second annular gear 204 rotate in a respective first direction and second direction regardless of the direction of rotation of the input shaft 106. Thus, the energy conversion apparatus 100 may convert oscillating rotation of the input shaft 106 into rotation in a single direction for each of the first annular gear 202 and the second annular gear 204.

In some embodiments, the energy conversion apparatus 100 may include a third annular gear 206. In some embodiments, the third annular gear 206 may be operatively coupled to the first annular gear 202. For example, the third annular gear 206 may be operatively coupled to the first annular gear 202 through the first transmitting shaft 302. The first transmitting gear 304 may be operatively engaged with the first annular gear 202 through interlocking teeth as described above. The first transmitting gear 304 may be operatively coupled to a third transmitting gear 314 through the first transmitting shaft 302. The third transmitting gear 314 may be operatively engaged with the third annular gear 206 through interlocking teeth in a similar manner to the operative engagement between the first transmitting gear 304 and the first annular gear 202. The first annular gear 202 may cause the first transmitting shaft 302 to rotate through the operative engagement between the first annular gear 202 and the first transmitting gear 304. The first transmitting shaft 302 may in turn cause the third transmitting gear 314 to rotate in the same direction as the first transmitting gear 304. The first transmitting gear 304 may then cause the third annular gear 206 to rotate in substantially the same direction as the first annular gear 202.

Accordingly, the first annular gear 202 and the third annular gear 206 may rotate in the first direction, while the second annular gear 204 may rotate in the second direction opposite the first annular gear 202 and the third annular gear 206. As the first annular gear 202 and the third annular gear 206 rotate in a direction opposite the second annular gear 204, a relative rotational speed between the first annular gear 202 or third annular gear 206 and the second annular gear 204 may be greater than the rotational speed of each individual first annular gear 202, second annular gear 204, and third annular gear 206. For example, if each of the first annular gear 202, second annular gear 204, and third annular gear 206 are rotating at substantially the same speed, the relative rotational speed between the first annular gear 202 or the third annular gear 206 and the second annular gear 204 may be substantially double the individual rotational speeds. As is described in greater detail below, rotating the first annular gear 202, the second annular gear 204, and third annular gear 206 relative to one another may generate electrical energy.

In some embodiments, the third annular gear 206 may be coupled to the input shaft 106 through a rotatable coupling, such as a bearing (e.g., plain bearing, needle bearing, ball bearing, thrust bearing, tapered bearing, magnetic bearing, etc.). The rotatable coupling may be configured to allow the third annular gear 206 to freely rotate about the input shaft 106. For example, the input shaft 106 may limit radial movement of the third annular gear 206, such that the third annular gear 206 remains substantially coaxial with the input shaft 106, while allowing rotational movement about the input shaft 106 regardless of a direction of rotation of the input shaft 106. In some embodiments, the third annular gear 206 may be selectively engaged by the input shaft 106 through a direction limiting device 318 similar to the first annular gear 202.

In some embodiments, the energy conversion apparatus 100 may include additional annular gears operatively coupled to the first annular gear 202 or the second annular gear 204 through the respective first transmitting shaft 302 and second transmitting shaft 308 similar to the operative coupling of the first annular gear 202 and the third annular gear 206. For example, the energy conversion apparatus 100 may include a fourth annular gear on an opposite side of the third annular gear 206 from the second annular gear 204. The fourth annular gear may be substantially coaxial with the first annular gear 202, second annular gear 204, and third annular gear 206 along the input shaft 106. In some embodiments, the fourth annular gear may be operatively coupled to the second annular gear 204 through the second transmitting shaft 308, such that the fourth annular gear rotates in substantially the same direction as the second annular gear 204 and opposite the rotational direction of the first annular gear 202 and the third annular gear 206. The energy conversion apparatus 100 may have similar stacks of coaxial annular gears extending to five annular gears, six annular gears, seven annular gears, etc. The coaxial annular gears may alternate direction of rotation, such that none of the coaxial annular gears rotate in the same direction as a proximate coaxial annular gear. For example, each coaxial annular gear may be driven by a different one of the first transmitting shaft 302 and the second transmitting shaft 308 than a proximate coaxial annular gear.

In some embodiments, the input shaft 106 may drive more than one set of coaxial annular gears 202, 204, 206. For example, the input shaft 106 may be operatively coupled to another similarly configured energy conversion apparatus 100, such that a first energy conversion apparatus 100 and a second energy conversion apparatus 100 are stacked on the same input shaft 106. The input shaft 106 may be operatively coupled to the first annular gear 202 and the second annular gear 204 of the first energy conversion apparatus 100 through the direction limiting devices 318 as described above. The input shaft 106 may extend beyond the third annular gear 206 and engage a first annular gear 202 and second annular gear 204 of the second energy conversion apparatus 100. The first energy conversion apparatus 100 and the second energy conversion apparatus 100 may be separated such that the first transmitting shaft 302 and the second transmitting shaft 308 of the first energy conversion apparatus 100 are not coupled to the first transmitting shaft 302 and the second transmitting shaft 308 of the second energy conversion apparatus 100 enabling the sets of coaxial annular gears 202, 204, 206 of the first energy conversion apparatus 100 to move independently of the coaxial annular gears 202, 204, 206 in the second energy conversion apparatus 100.

Figure 4:
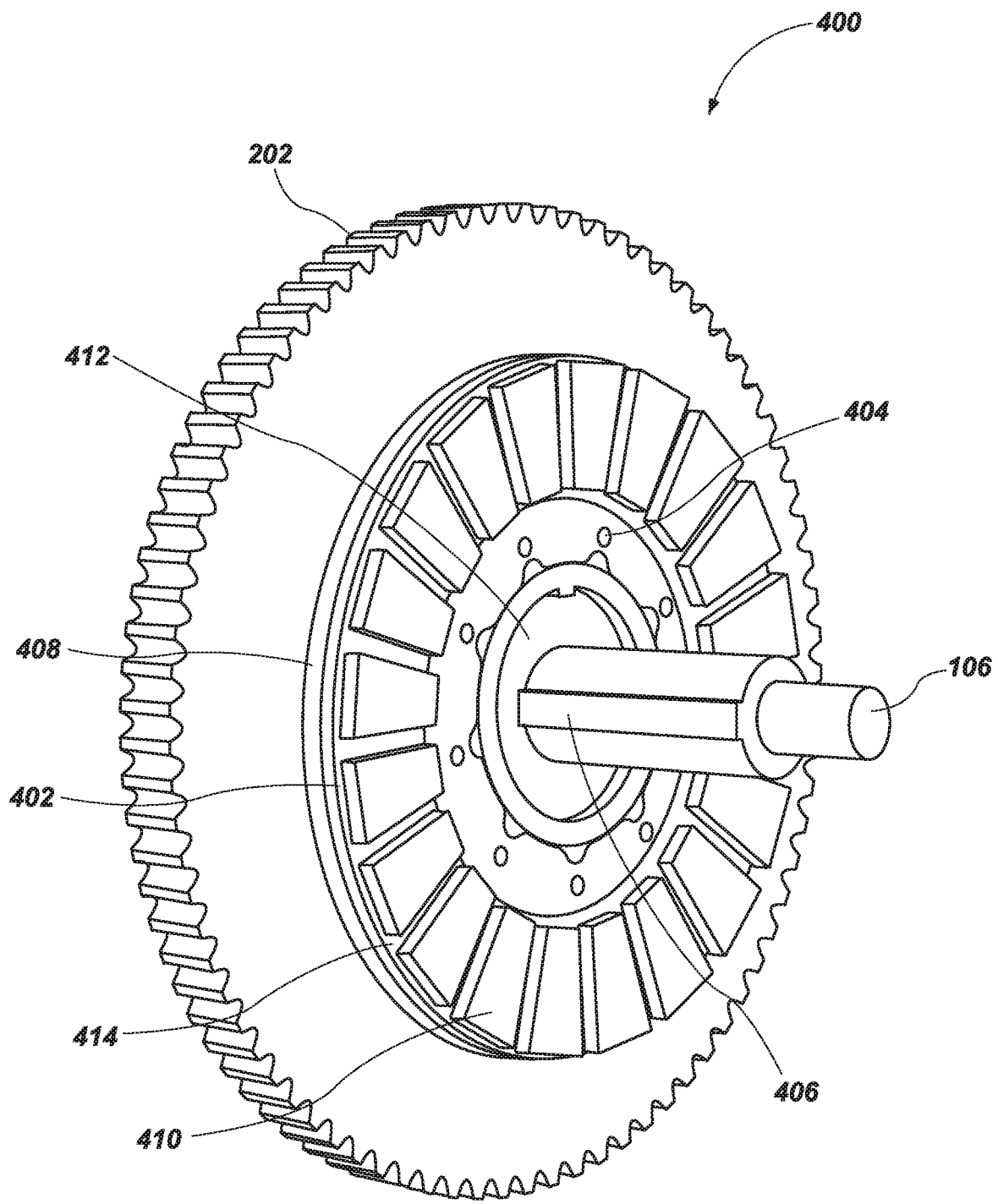
FIG. 4 illustrates a perspective view of an embodiment of an annular gear assembly of the energy conversion apparatus of FIGS. 1-3 in accordance with an embodiment of the present disclosure.

FIG. 4 illustrates an embodiment of a first annular gear assembly 400 according to one or more embodiments of the present disclosure. The first annular gear assembly 400 may include the first annular gear 202. The first annular gear 202 may be coupled to a plate magnet 402. The plate magnet 402 may include multiple permanent magnets 410 arranged radially about a core 414. The permanent magnets 410 may be arranged such that the poles (e.g., north pole, south pole) of the permanent magnets 410 alternate around the core 414. In other words, each permanent magnet 410 may have a different polarity than an adjacent permanent magnet 410. For example, a first permanent magnet 410 may be arranged such that the north pole of the permanent magnet 410 is radially outward (e.g., farther away from an axis of the plate magnet 402). The permanent magnet 410 arranged in the proximate radially location about the core 414 may be arranged such that the south pole of the permanent magnet 410 is radially outward. In some embodiments, the plate magnet 402 may include more than four permanent magnets 410 arranged about the core 414, such as between about eight and about forty permanent magnets 410 or between about ten and about thirty permanent magnets 410. The permanent magnets 410 may be arranged such that the permanent magnets 410 are equally spaced radially about the core 414 (e.g., such that an angular displacement between each of the permanent magnets 410 is substantially the same).

The core 414 may be formed from a ferromagnetic material, such as iron, nickel, cobalt, gadolinium, and alloys thereof (e.g., steel). The permanent magnets 410 may be attached to the core 414 through hardware (e.g., screws, bolts, rivets, pins, etc.), an adhesive, an epoxy, a heating process, a melting process, a molding process, or combinations thereof. For example, the permanent magnet 410 may be molded into the core 414 through an epoxy molding process. In some embodiments, the permanent magnet 410 may be coupled to the core 414 with hardware and secured with an epoxy.

The plate magnet 402 may include multiple mounting holes 404 arranged radially about the plate magnet 402. The mounting holes 404 may be configured to receive hardware, such as bolts, studs, screws, rivets, etc. The hardware may be disposed in the mounting holes 404 to secure the plate magnet 402 to the first annular gear 202. In some embodiments, the first annular gear 202 may include complementary holes configured to receive the hardware passing through the mounting holes 404. For example, studs or bolts may pass through the first annular gear 202 and into or through the mounting holes 404 in the plate magnet 402. In some embodiments, hardware such as studs may extend from a face of the first annular gear 202, such that the plate magnet 402 may be disposed over the studs with the studs passing through the mounting holes 404 in the plate magnet 402. In some embodiments, the hardware may include a head configured to abut against a face of the plate magnet 402 securing the plate magnet 402 to the first annular gear 202. In some embodiments, the hardware may include threads or another coupling means (e.g., grooves, locking pins, clevis pin, etc.) configured to receive additional hardware, such as nuts, pins, washers, locking washers, locking nuts, crown nuts, etc. such that the additional hardware may abut against the face of the plate magnet 402 securing the plate magnet 402 to the first annular gear 202.

The first annular gear assembly 400 may include a spacer 408 configured to position the plate magnet 402 axially (e.g., displace in an axial direction) with respect to the first annular gear 202. For example, the spacer 408 may be configured to position the plate magnet 402 in an optimal position with respect to an adjoining component, such as an armature (e.g., armature 702 (FIG. 7)). The optimal position may be determined such that the plate magnet 402 may interact with the adjoining component while the first annular gear 202 does not interfere with movement of the adjoining component. As described in further detail below with respect in FIG. 7, the plate magnet 402 and the armature 702 may form a generator. Rotation of the plate magnet 402 relative to the armature 702 may generate electricity through a rotating magnetic field caused by the relative rotation between the plate magnet 402 and the armature 702.

In some embodiments, the spacer 408 may be formed as part of the first annular gear 202. For example, the spacer 408 may be machined from a face of the first annular gear 202. In some embodiments, the spacer 408 may be formed during a forging or molding process. In some embodiments, the spacer 408 may be a separate component coupled to the first annular gear 202. For example, the spacer 408 may be coupled to the first annular gear 202 through an adhesive (e.g., glue, epoxy, etc.), a physiochemical process (e.g., welding, soldering, etc.), or a hardware connection (e.g., nuts and bolts, screws, rivets, etc.). In some embodiments, the spacer 408 may include complementary mounting holes to the mounting holes 404 in the plate magnet 402 and/or the first annular gear 202. The hardware used to mount the plate magnet 402 to the first annular gear 202 may pass through the complementary mounting holes in the spacer 408 as well as the mounting holes 404 in the magnet and the complementary holes in the first annular gear 202. When the hardware is tightened to secure the plate magnet 402 to the first annular gear 202, the spacer 408 may be secured both radially and axially between the plate magnet 402 and the first annular gear 202.

The first annular gear assembly 400 may include a one-way bearing 412 configured as the direction limiting device 318 discussed above. The one-way bearing 412 may be configured to selectively transmit rotational forces from the input shaft 106 to the first annular gear 202. As described above, the one-way bearing 412 may transmit rotational forces in a first direction to the first annular gear 202 from the input shaft 106 and may permit the input shaft 106 to rotate in a second direction without transmitting the rotational forces in the second direction to the first annular gear 202. The one-way bearing 412 may be configured to receive rotational forces from the input shaft 106 through a complementary geometric feature between the input shaft 106 and the one-way bearing 412 such as a key 406.

The key 406 may extend axially along an outer surface of the input shaft 106. The key 406 may be a protrusion from the input shaft 106 configured to interact with a complementary groove in the one-way bearing 412, as shown in FIG. 4. In some embodiments, the key 406 may be an axial groove in the input shaft 106 configured to interact with a complementary protrusion in the one-way bearing 412. In some embodiments, the one-way bearing 412 and/or input shaft 106 may include multiple grooves and/or protrusions, such as two, four, eight, etc.

Figure 5:
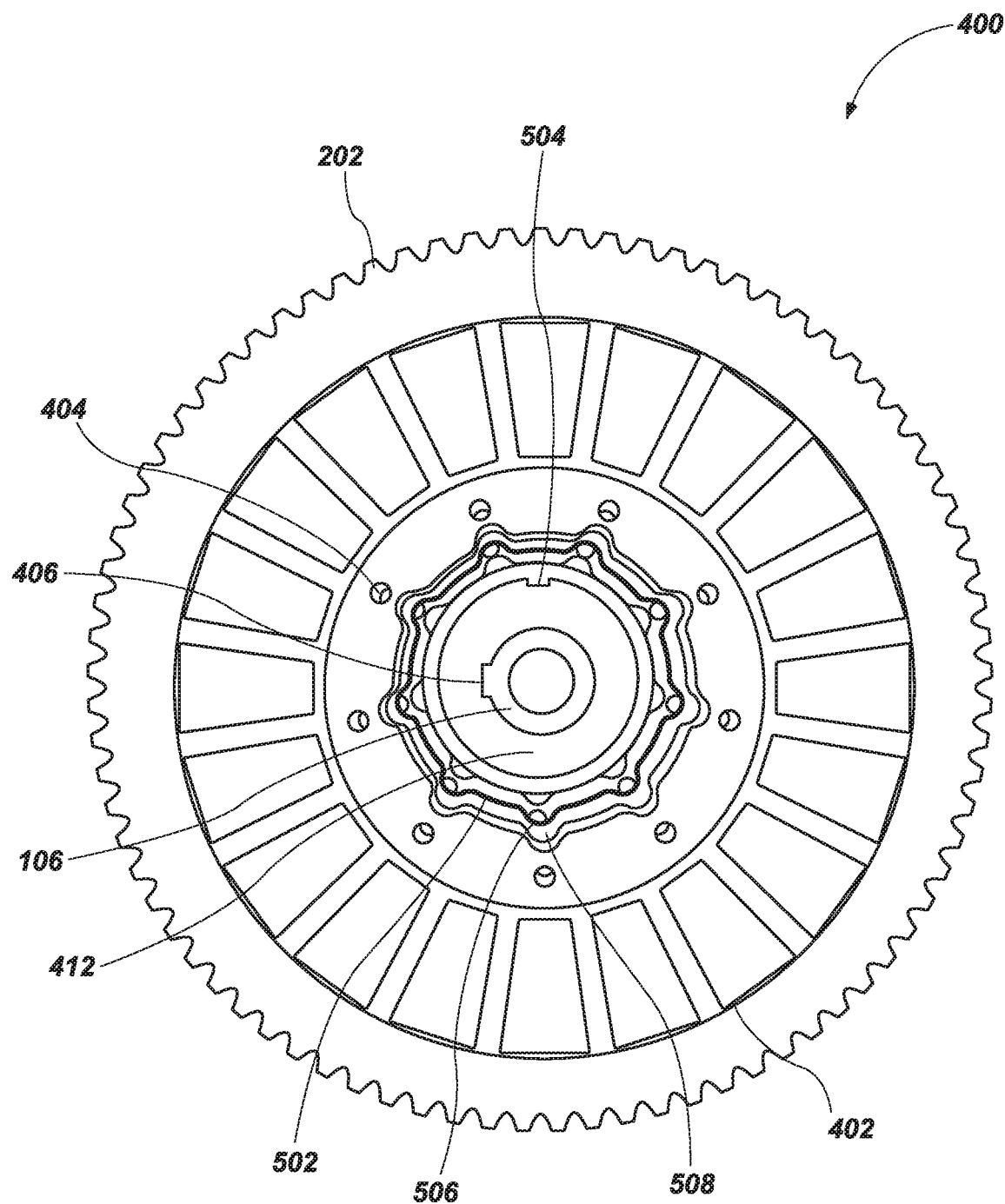
FIG. 5 illustrates a plan view of the annular gear assembly of FIG. 4 in accordance with an embodiment of the present disclosure.

FIG. 5 illustrates a plan view of the first annular gear assembly 400. The one-way bearing 412 may be disposed in a bearing casing 502. The bearing casing 502 may be configured to receive rotational input from the one-way bearing 412. For example, the one-way bearing 412 and the bearing casing 502 may interact through a complementary geometric feature, such as a key 504, as shown in FIG. 5. The key 504 may be a protrusion extending from the bearing casing 502 configured to interact with a complementary groove in the one-way bearing 412. In some embodiments, the key 504 may be a protrusion extending from the one-way bearing 412 configured to interact with a complementary groove in the bearing casing 502. In some embodiments, the key 504 may be corresponding grooves in the one-way bearing 412 and the bearing casing 502 configured to interact through a complementary component, such as key stock, or a pin (e.g., a roll pin), insertable into both grooves, operatively locking the grooves together.

The one-way bearing 412 may transmit rotational forces to the bearing casing 502 through the key 504 when the one-way bearing 412 is transmitting rotational forces from the input shaft 106. As described above, the one-way bearing 412 may transmit rotational forces from the input shaft 106 in one direction and may not transmit the rotational forces from the input shaft 106 in another direction.

The bearing casing 502 may include one or more protrusions 506 extending from the bearing casing 502. For example, the bearing casing 502 may include several protrusions 506 equally spaced radially about an outer portion of the bearing casing 502. The several protrusions 506 may form a series of teeth similar to a cog or a gear. The first annular gear 202 may include complementary geometry configured to receive the bearing casing 502. For example, the first annular gear 202 may include complementary recesses 508 configured to receive the protrusions 506. The bearing casing 502 may be disposed into a central portion of the first annular gear 202 such that the protrusion 506 may interlock with the complementary recesses 508. Thus, motion of the bearing casing 502 may be transmitted to the first annular gear 202 through the interlocked protrusion 506 and recesses 508.

As described above, the input shaft 106 may transmit rotational forces in a first direction to the one-way bearing 412 through the key 406. The one-way bearing 412 may transmit the rotational forces in the first direction to the bearing casing 502 through the key 504. The bearing casing 502 may then transmit the rotational forces to the first annular gear 202 through the interlocked protrusion 506 and recesses 508. The first annular gear 202 may then rotate in the first direction along with the plate magnet 402 coupled to the first annular gear 202 through the mounting holes 404 and associated hardware. When the input shaft 106 rotates in a second direction, the input shaft 106 may transmit rotational forces to the one-way bearing 412 through the key 406. However, the one-way bearing 412 may isolate the rotational forces from the bearing casing 502 such that the rotational forces in the second direction are not transmitted to the bearing casing 502 or the first annular gear 202.

Figure 6:
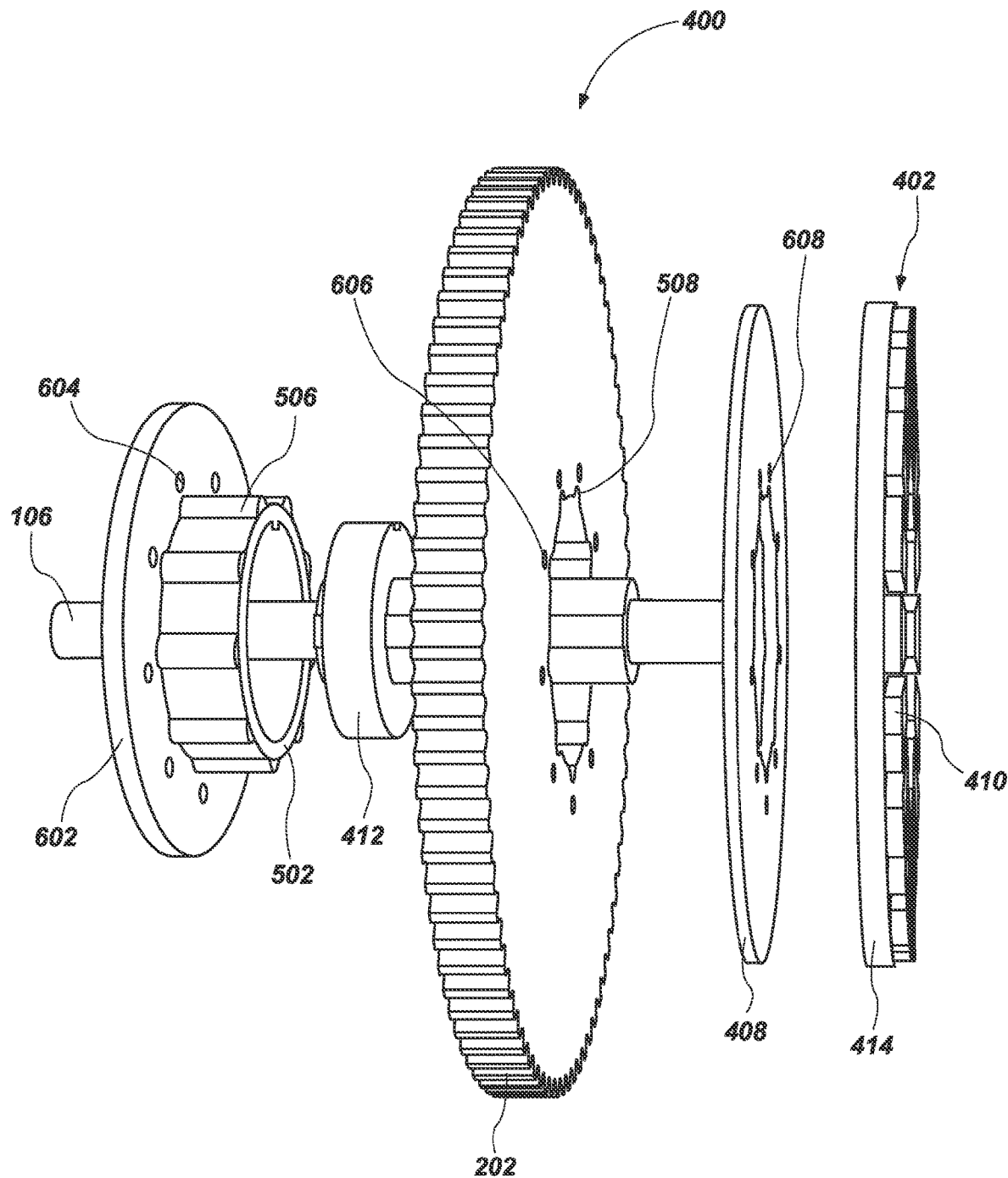
FIG. 6 illustrates an expanded view of the annular gear assembly of FIGS. 4 and 5 in accordance with an embodiment of the present disclosure.

FIG. 6 illustrates an exploded view of the first annular gear assembly 400. The first annular gear 202, the spacer 408, the one-way bearing 412, and the plate magnet 402 may be arranged coaxially along the input shaft 106. The bearing casing 502 may be coupled to a mounting plate 602. In some embodiments, the mounting plate 602 may be configured to secure all of the individual components of the first annular gear assembly 400 to one another.

For example, the mounting plate 602 may be formed as part of the bearing casing 502. As described above the bearing casing 502 may include a series of protrusions 506 configured to interlock with a complementary series of recesses 508 in at least the first annular gear 202. In some embodiments, the spacer 408 and/or the plate magnet 402 may include similar recesses configured to receive and/or interlock with the protrusions 506 of the bearing casing 502. The mounting plate 602 may provide a stop configured to retain the first annular gear 202, spacer 408, and plate magnet 402 on the bearing casing 502. In some embodiments, the mounting plate 602 may include a series of mounting holes 604. The series of mounting holes 604 may be complementary to a set of mounting holes 606 in the first annular gear 202, a set of mounting holes 608 in the spacer 408, and the mounting holes 404 in the plate magnet 402. All of the mounting holes 604, 606, 608, 404 may be aligned such that hardware may be disposed through all of the aligned mounting holes 604, 606, 608, 404. The hardware may secure each of the mounting plate 602, first annular gear 202, spacer 408, and the plate magnet 402 to one another both axially and radially.

In some embodiments, the mounting plate 602 may include studs extending from the mounting plate 602. The studs may be complementary to the mounting holes 606, 608, 404 in the first annular gear 202, the spacer 408, and the plate magnet 402 such that the first annular gear 202, spacer 408, and plate magnet 402 may be disposed over the studs with the studs extending through the mounting holes 606, 608, 404. Additional hardware (e.g., nuts, washers, pins, etc.) may then be coupled to an end of the studs extending through the mounting holes 404 in the plate magnet 402 securing each of the first annular gear 202, the spacer 408, and the plate magnet 402 to the mounting plate 602 both radially and axially.

Figure 7:
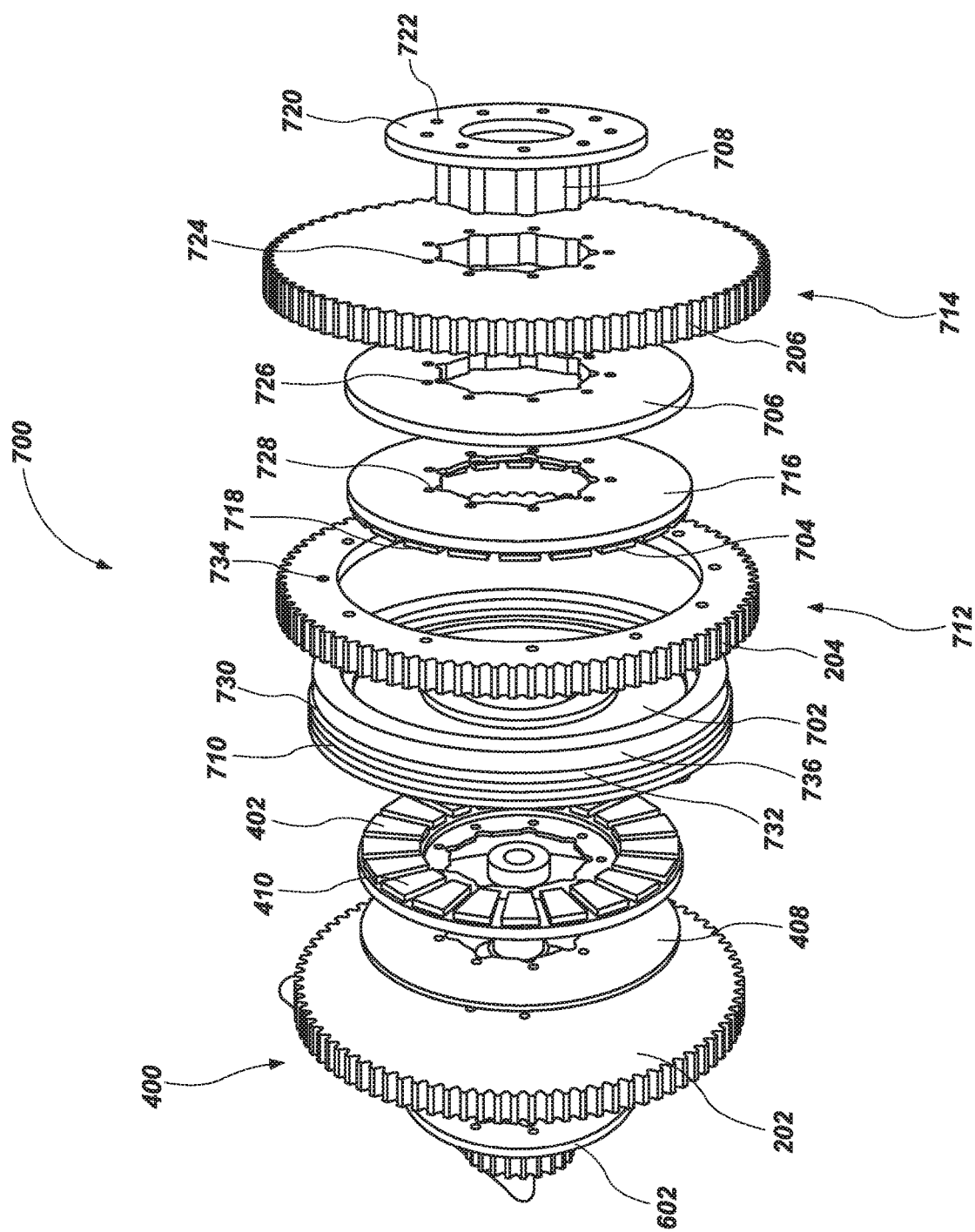
FIG. 7 illustrates a perspective expanded view of a generator assembly of the energy conversion apparatus of FIGS. 1-3 in accordance with an embodiment of the present disclosure.
Figure 8:
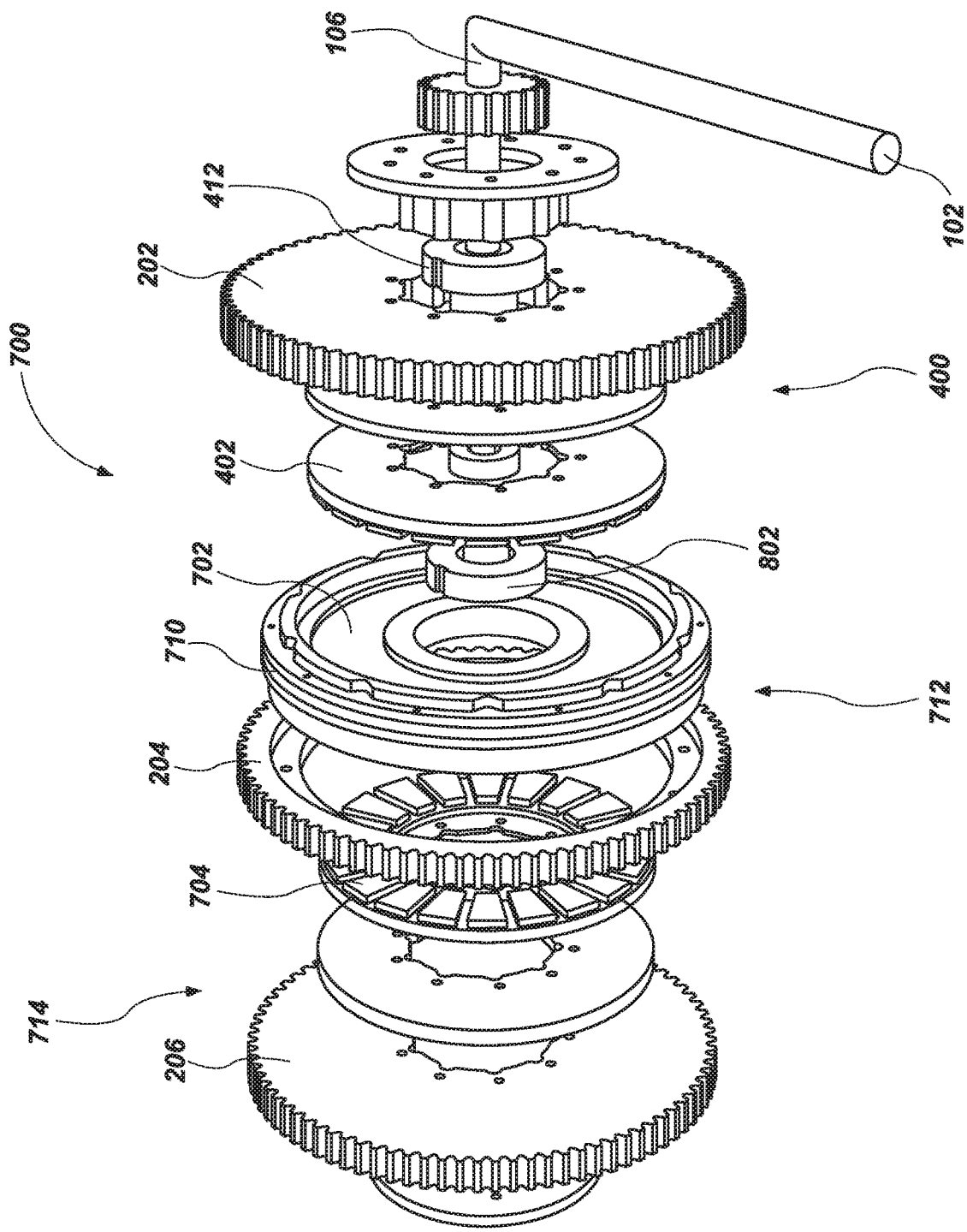
FIG. 8 illustrates another perspective expanded view of the generator assembly of FIG. 7 in accordance with an embodiment of the present disclosure.
Figure 9:
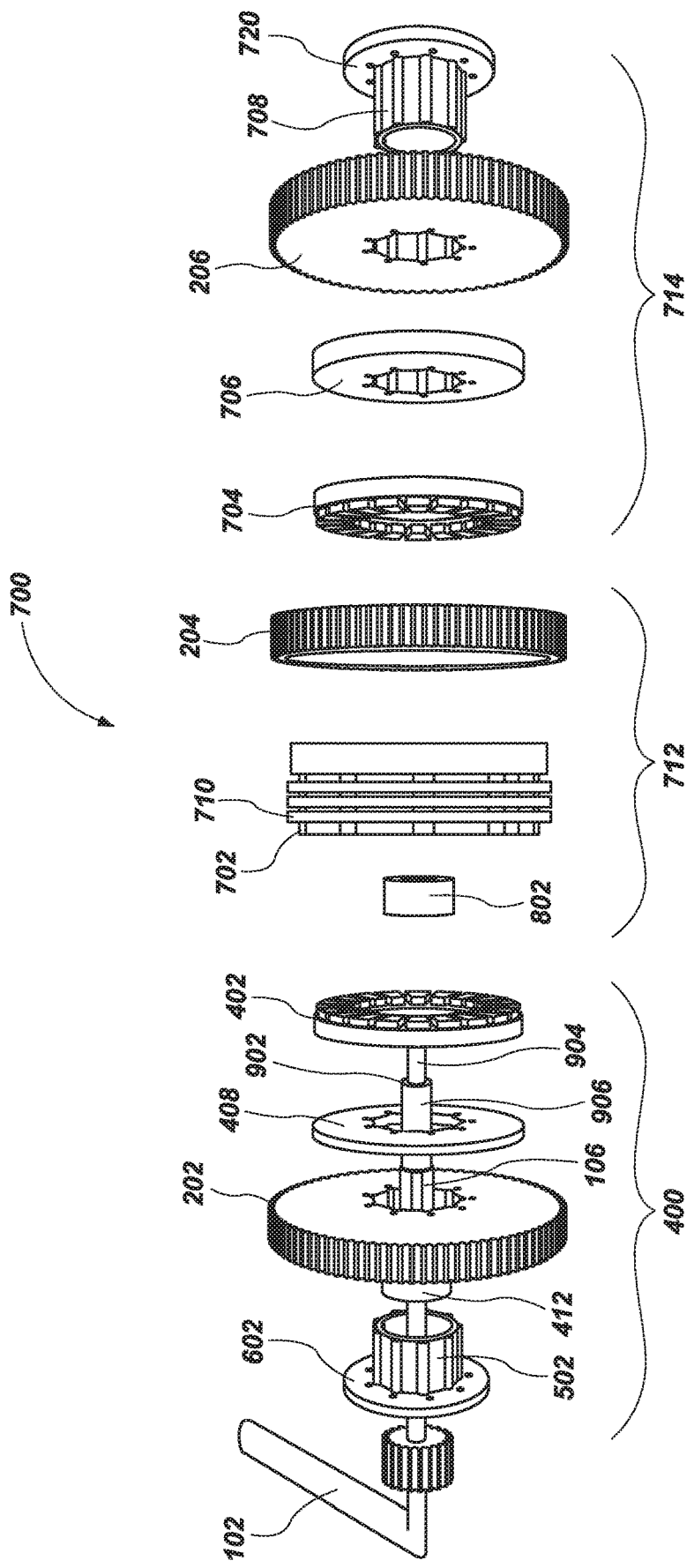
FIG. 9 illustrates a side expanded view of the generator assembly of FIGS. 7 and 8 in accordance with an embodiment of the present disclosure.

FIG. 7, FIG. 8, and FIG. 9 illustrate exploded views of the generator assembly 700 of the energy conversion apparatus 100. The generator assembly 700 may include the first annular gear assembly 400 described above, a second annular gear assembly 712 and a third annular gear assembly 714.

Referring to FIG. 7, the third annular gear assembly 714 may be similar to the first annular gear assembly 400. For example, the third annular gear assembly 714 may include a plate magnet 704 including a core 716 and multiple permanent magnets 718 arranged radially about the core 716. The third annular gear assembly 714 may also include a secondary spacer 706 configured to position the plate magnet 704 axially relative to the third annular gear 206. The third annular gear assembly 714 may include a bearing casing 708 coupled to a mounting plate 720 similar to the mounting plate 602 and bearing casing 502 of the first annular gear assembly 400.

The mounting plate 720 may be configured with mounting holes 722 complementary to a set of mounting holes 724 through the third annular gear 206, a set of mounting holes 726 through the secondary spacer 706, and a set of mounting holes 728 through the plate magnet 704. The mounting holes 722, 724, 726, and 728 may be configured to receive hardware. The hardware may pass through the mounting holes 722, 724, 726, and 728, such that the hardware may secure the plate magnet 704, the secondary spacer 706, and the third annular gear 206 to the mounting plate 720 both axially and radially. The bearing casing 708 may have an outer geometric pattern, such as a series of protrusions configured to interact with complementary geometry on the third annular gear 206, the secondary spacer 706, and the mounting holes 728.

The bearing casing 708 may be configured to house a bearing configured to couple the bearing casing 708 to the input shaft 106. The bearing coupling the bearing casing 708 to the input shaft 106 may be a normal bearing, such as a ball bearing, a needle bearing, a thrust bearing, a plain bearing, a tapered bearing, etc. In some embodiments, the bearing coupling the bearing casing 708 to the input shaft 106 may be a one-way bearing similar to the one-way bearing 412 coupling the bearing casing 502 of the first annular gear assembly 400 to the input shaft 106.

The second annular gear assembly 712 may include an armature 702. The armature 702 may include a flange 730. The flange 730 may be configured to provide a mounting surface on the armature 702 for the second annular gear 204. The second annular gear 204 may be configured as a ring configured to mount over an outside surface 736 of the armature 702. The second annular gear 204 may include a series of mounting holes 734 arranged around the second annular gear 204. The mounting holes 734 may pass through the second annular gear 204 and correspond with mounting holes 732 in the flange 730 of the armature 702. In some embodiments, the mounting holes 732 in the flange 730 may be threaded. For example, the mounting holes 732 may have threads configured to receive hardware through the mounting holes 734 in the second annular gear 204 securing the second annular gear 204 to the flange 730. In some embodiments, the mounting holes 732 may be blind holes (e.g., not passing entirely through the flange 730). In some embodiments, the mounting holes 732 may be through holes enabling the hardware to pass through the flange 730 and exit on an opposite side of the flange 730. In some embodiments, the mounting holes 734 in the second annular gear 204 may be threaded and the mounting holes 732 in the flange 730 may be straight holes (e.g., without threads). The hardware may pass through the mounting holes 732 in the flange 730 and thread into the mounting holes 734 in the second annular gear 204. In some embodiments, the hardware may pass through both the mounting holes 732 in the flange 730 and the mounting holes 734 in the second annular gear 204. The hardware may be secured with additional hardware, such as nuts, washers, clips, pins, etc. on at least one side of the second annular gear assembly 712. In some embodiments, the flange 730 may include studs extending from the flange 730 that are complementary to the mounting holes 734 in the second annular gear 204. For example, the second annular gear 204 may be disposed over the outside surface 736 of the armature 702 such that the studs extend through the mounting holes 734 in the second annular gear 204. The second annular gear 204 may then be secured to the armature 702 with additional hardware, such as nuts, washers, locking nuts, locking washers, pins, clips, etc. secured to the studs.

The armature 702 may include coils embedded within the armature 702. For example, the armature 702 may be formed from a composite material (e.g., fiber glass) or a polymer (e.g., polytetrafluoroethylene (PTFE), polyvinylchloride (PVC), etc.) formed around a series of coils. The coils may include multiple windings (e.g., turns, wraps) of a conductive material such as copper wire. For example, each coil may have between about ten windings and about ten-thousand windings, such as between about seventy windings and about one-thousand windings, or between about ninety windings and about two-hundred windings. In some embodiments, the number of windings may be determined based on parameters of the motion of the input shaft 106, such as rotational speed (e.g., maximum rotational speed, average rotational speed, etc.). In some embodiments, the number of windings in each coil may be determined based on parameters of a desired output from the coils, such as an output voltage, an output current, an output power, etc. The coils may be arranged radially about an axis of the armature 702.

Relative rotation between the armature 702 and the plate magnet 402 and/or the plate magnet 704 may generate a current in the coils due to the changing magnetic field caused by the movement between the armature 702 and the plate magnet 402 and/or the plate magnet 704. In other words, a combination of the armature 702, the plate magnet 402, and/or the plate magnet 704 may form an internal generator of the energy conversion apparatus 100. Accordingly, as is described in further detail below, motion input into the energy conversion apparatus 100 via the input gear 104 and/or input shaft 106 (e.g., motion experienced by the input arm 108 or imparted on the input gear 104 and/or input shaft 106) is converted to electrical energy.

The coils may be electrically coupled to transmission rings 710 arranged about the armature 702. For example, multiple coils may be connected together in series and then coupled to a respective transmission ring 710. In some embodiments, the coils may each be coupled to a respective transmission ring 710, such that multiple coils are coupled to a transmission ring 710 in parallel. In some embodiments, multiple coils may be connected in series and multiple groups of coils connected in series may be connected to a transmission ring 710 in parallel. In some embodiments, the armature 702 may include a single transmission ring 710 such that all of the coils in the armature 702 are coupled to the same transmission ring 710.

In some embodiments, the armature 702 may include multiple transmission rings 710, such that the coils in the armature 702 may be separated into multiple groups, wherein each group of coils is connected to one of the multiple transmission rings 710. For example, the armature 702 may include three transmission rings 710 as shown in FIG. 7. Each of the transmission rings 710 may have a group of coils within the armature 702 coupled to the transmission ring 710. Each group of coils may represent a phase of power. The phases may be formed by alternating the group to which each coil is coupled radially about the armature 702. For example, each coil may be coupled to a different group of coils from a radially adjacent coil within the armature 702, such that every third coil may be coupled to the same group. As each permanent magnet 410, 718 passes each coil in the armature 702 when the second annular gear assembly 712 is rotating relative to the first annular gear assembly 400 and the third annular gear assembly 714 the permanent magnet 410, 718 may induce a current in each coil. The current and/or an associated voltage may be passed to the respective transmission ring 710, either directly from each coil or through each coil group.

The transmission rings 710 may be configured to transmit the current and/or voltage generated by the changing magnetic field around the armature 702 to an adjacent component or an external component. For example, power pickups, such as brushes, may be in electrical contact with the transmission rings 710 and configured to transmit the current, voltage, and/or power generated by the generator assembly 700 to another component, such as a transformer, a power inverter, a rectifier, transmission lines, power storage, etc.

Referring to FIG. 8, the armature 702 may be coupled to the input shaft 106 through a one-way bearing 802. The one-way bearing 802 may act as a direction limiting device 318, as described above. The one-way bearing 802 may selectively transmit rotational forces from the input shaft 106 to the armature 702. For example, if the input shaft 106 is rotating in a first direction, the one-way bearing 802 may allow the input shaft 106 to rotate relative to the armature 702, such that no rotational forces in the first direction are transmitted to the armature 702. Instead the armature 702 may be driven in a second direction due to rotational forces transmitted to the second annular gear 204 through the second transmitting shaft 308 (FIG. 3), as described above. When the input shaft 106 is rotating in the second direction, the one-way bearing 802 may transmit rotational forces in the second direction from the input shaft 106 to the armature 702. The armature 702 may then transmit the rotational forces in the second direction to the second annular gear 204 such that the second annular gear 204 may transmit the rotational forces to the first annular gear 202 and/or the third annular gear 206 through the second transmitting shaft 308 and the first transmitting shaft 302 (FIG. 3), as described above.

The one-way bearing 802 may be configured in a similar manner to the one-way bearing 412 in the first annular gear assembly 400 described above. For example, the one-way bearing 802 may include a groove complementary to the key 406 (FIG. 4) on the input shaft 106. The input shaft 106 may input the rotational force into the one-way bearing 802 through the key 406. The one-way bearing 802 may then be configured to selectively pass the rotational forces through the one-way bearing 802 to the armature 702 or isolate the rotational forces from the armature 702. The one-way bearing 802 may interact with the armature 702 through a complementary geometric feature, such as a key and complementary groove. For example, the geometric feature may be a protrusion extending from the armature 702 configured to interact with a complementary groove in the one-way bearing 802. In some embodiments, the geometric feature may be a protrusion extending from the one-way bearing 802 configured to interact with a complementary groove in the armature 702. In some embodiments, the geometric feature may be corresponding grooves in the one-way bearing 802 and the armature 702 configured to interact through a complementary component, such as key stock, or a pin (e.g., a roll pin), insertable into both grooves, operatively locking the grooves together. In some embodiments, the armature 702 may interact with the one-way bearing 802 through a frictional engagement, such as a press fit, friction fit, set screw, etc.

Referring to FIG. 9, the input shaft 106 may include sections configured to interact with the first annular gear assembly 400, the second annular gear assembly 712, and the third annular gear assembly 714. For example, the input shaft 106 may include a non-keyed portion 904 and a keyed portion 906. The keyed portion 906 may include the key 406 extending axially along the input shaft 106. The non-keyed portion 904 may have a substantially circular cross-section without any protrusions (e.g., keys) extending from the surface of the input shaft 106.

The non-keyed portion 904 may be configured to receive the third annular gear assembly 714. As described above, the third annular gear assembly 714 may be coupled to the input shaft 106 through a normal bearing (e.g., roller bearing, needle bearing, tapered bearing, thrust bearing, plain bearing, magnetic bearing, etc.) such that all motion of the input shaft 106 is substantially isolated from the third annular gear 206 by the bearing. The non-keyed portion 904 may allow the normal bearing to be coupled to the non-keyed portion 904 of the input shaft 106 without a geometric feature to transmit rotational forces from the input shaft 106 to the bearing.

The keyed portion 906 may be separated from the non-keyed portion 904 by a shoulder 902. The shoulder 902 may substantially prevent the third annular gear assembly 714 from extending into the keyed portion 906. In some embodiments, the non-keyed portion 904 may have a smaller diameter than the keyed portion 906. For example, a larger diameter may allow the input shaft 106 to transmit a larger rotational force without damaging the input shaft 106. Where the non-keyed portion 904 is not transmitting a rotational force the diameter may be decreased. In some embodiments, reducing a diameter of the non-keyed portion 904 of the input shaft 106 may decrease a rotating mass of the generator assembly 700. In some embodiments, reducing a diameter of the non-keyed portion 904 of the input shaft 106 may reduce a cost of materials. In some embodiments, reducing a diameter of the non-keyed portion 904 of the input shaft 106 may reduce manufacturing costs, such as by reducing assembly time. In some embodiments, the non-keyed portion 904 may be substantially the same diameter as the keyed portion 906, such that the shoulder 902 may be formed by the end of the key 406.

The keyed portion 906 may be configured to interact with the first annular gear assembly 400 and the second annular gear assembly 712. For example, the keyed portion 906 may be configured to receive the one-way bearing 412 and the one-way bearing 802. As described above, the input shaft 106 may transmit rotational forces to the one-way bearing 412 and the one-way bearing 802 through the key 406. The one-way bearing 412 and the one-way bearing 802 may selectively transmit the rotational forces to the respective first annular gear 202 and armature 702 depending on the direction of rotation of the input shaft 106.

Figure 10:
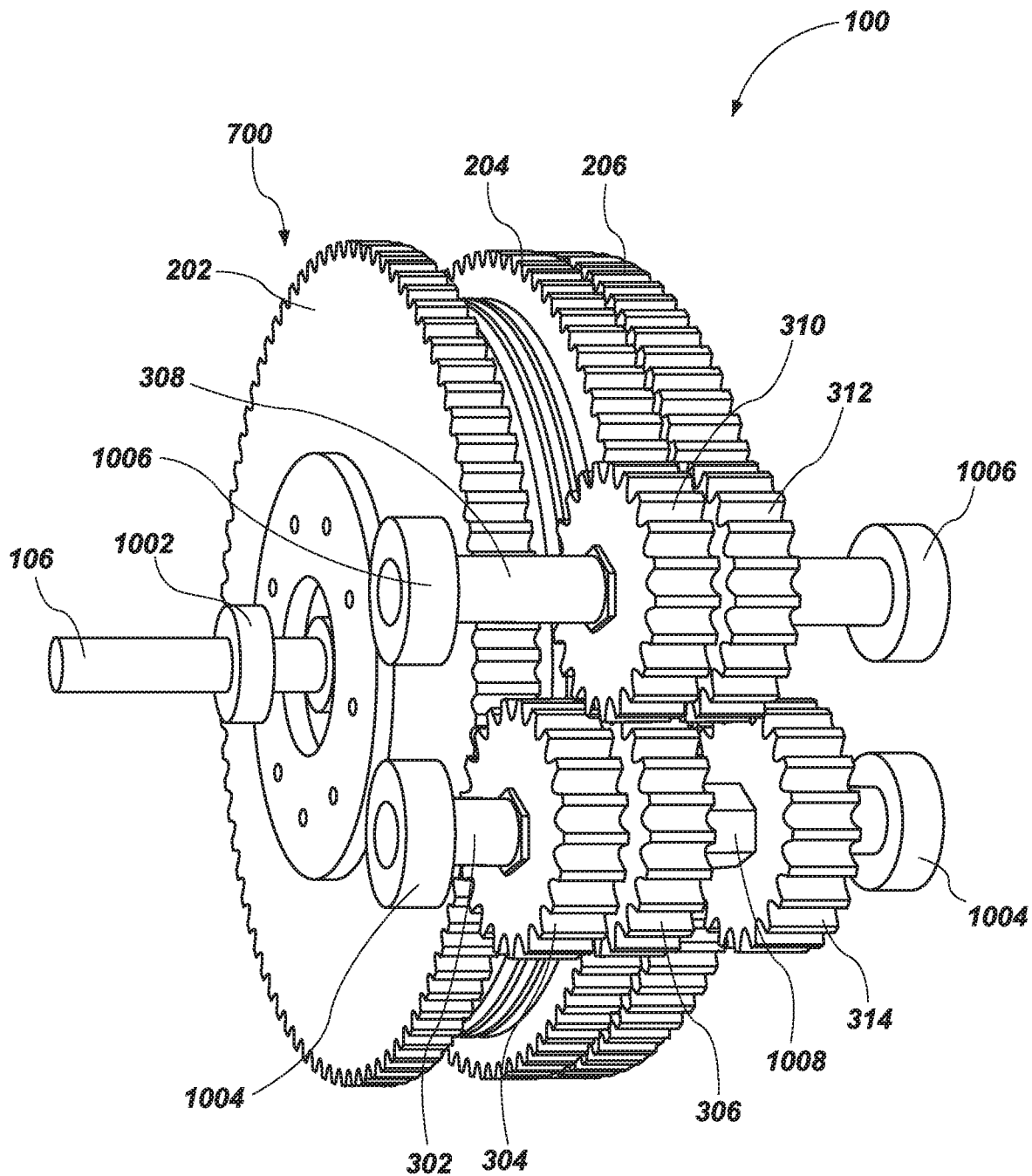
FIG. 10 illustrates a perspective view of an internal gear assembly of the energy conversion apparatus of FIGS. 1-3 in accordance with an embodiment of the present disclosure.
Figure 11:
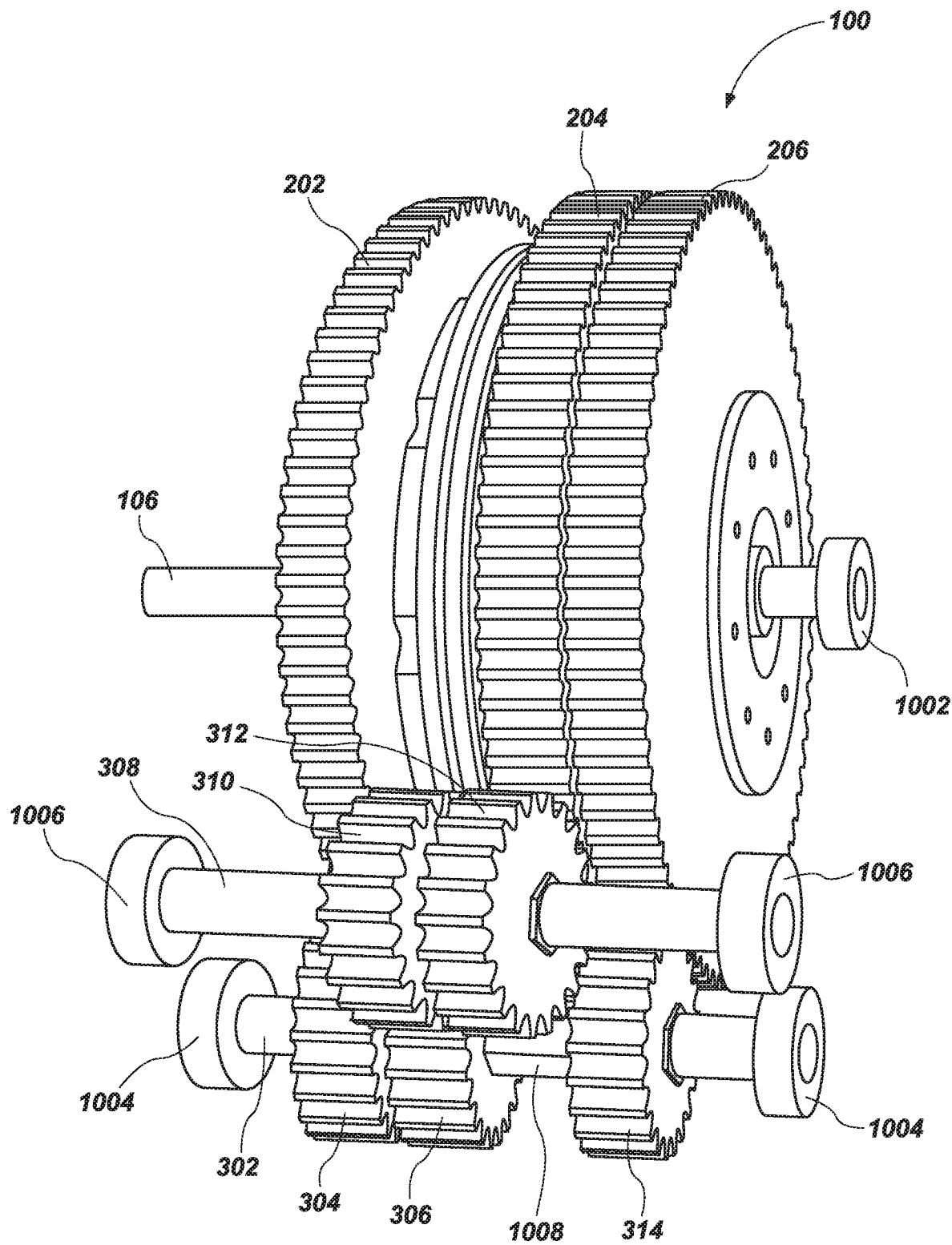
FIG. 11 illustrates another perspective view of the internal gear assembly of the FIG. 10 in accordance with an embodiment of the present disclosure.

FIG. 10 and FIG. 11 illustrate views of the energy conversion apparatus 100. As described above, the generator assembly 700 may include a first annular gear 202, second annular gear 204, and third annular gear 206 that may interact through the first transmitting shaft 302 and the second transmitting shaft 308 and associated gears 304, 306, 310, 312, and 314. As described above, the energy conversion apparatus 100 may be enclosed within a case 112 (FIG. 1). The first transmitting shaft 302 and the second transmitting shaft 308 may be positioned relative to the generator assembly 700 by mounting each of the input shaft 106, the first transmitting shaft 302, and the second transmitting shaft 308 to the case 112.

The input shaft 106 may be coupled to the case 112 through input shaft bearings 1002. The input shaft bearings 1002 may be positioned on opposing sides of the generator assembly 700. In some embodiments, the input shaft bearings 1002 may be configured to position the input shaft 106 both axially and radially relative to the case 112. For example, the input shaft bearings 1002 may be coupled to the input shaft 106 through an interference fit (e.g., press fit, friction fit, etc.) such that each input shaft bearing 1002 is secured to the input shaft 106 in both an axial position and a radial position. In some embodiments, one or more of the input shaft bearings 1002 may be coupled to the input shaft 106 through a complementary taper. For example, the complementary taper may be configured to limit axial movement of the input shaft bearing 1002 relative to the input shaft 106 in a first direction. The case 112 may then be configured to limit movement of the input shaft bearing 1002 relative to the input shaft 106 in a second direction opposite the first direction. In some embodiments, the input shaft bearing 1002 may be positioned such that there is a space between the generator assembly 700 and the case 112. The input shaft bearings 1002 may allow the input shaft 106 to rotate freely relative to the case 112. The input shaft bearings 1002 may be a ball bearing, roller bearing, needle bearing, tapered bearing, thrust bearing, plain bearing, magnetic bearing, etc.

The first transmitting shaft 302 may have respective first transmitting shaft bearings 1004 and the second transmitting shaft 308 may have respective second transmitting shaft bearings 1006 configured to position the associated first transmitting shaft 302 and second transmitting shaft 308 both axially and radially relative to the input shaft 106. For example, the first transmitting shaft bearings 1004 may be configured to position the first transmitting shaft 302 both axially and radially such that the teeth of the first transmitting gear 304 engage the teeth of the first annular gear 202 and such that the teeth of the third transmitting gear 314 engage the teeth of the third annular gear 206. The second transmitting shaft bearings 1006 may be configured to position the second transmitting shaft 308 both axially and radially relative to the input shaft 106 such that teeth of the second transmitting gear 312 engage the teeth of the second annular gear 204. The first transmitting shaft bearings 1004 and the second transmitting shaft bearings 1006 may further be configured to position the first transmitting shaft 302 and the second transmitting shaft 308 relative to one another such that the teeth of the first conversion gear 306 and the second conversion gear 310 engage one another.

In some embodiments, the first transmitting shaft 302 and/or the second transmitting shaft 308 may include one or more gear spacers 1008 arranged axially along the first transmitting shaft 302 and/or second transmitting shaft 308. The gear spacers 1008 may be configured to position the first transmitting gear 304, first conversion gear 306, second conversion gear 310, second transmitting gear 312, and/or third transmitting gear 314 axially along the respective first transmitting shaft 302 and second transmitting shaft 308. In some embodiments, one or more of the gears 304, 306, 310, 312, 314 may be positioned through another means, such as an interference fit (e.g., press fit, friction fit, etc.), a hardware connection (e.g., set screw, pin, collar, snap rings, clips, etc.), and/or shaft geometry (e.g., complementary shaft cross-sections, keys, grooves, etc.).

Figure 12:
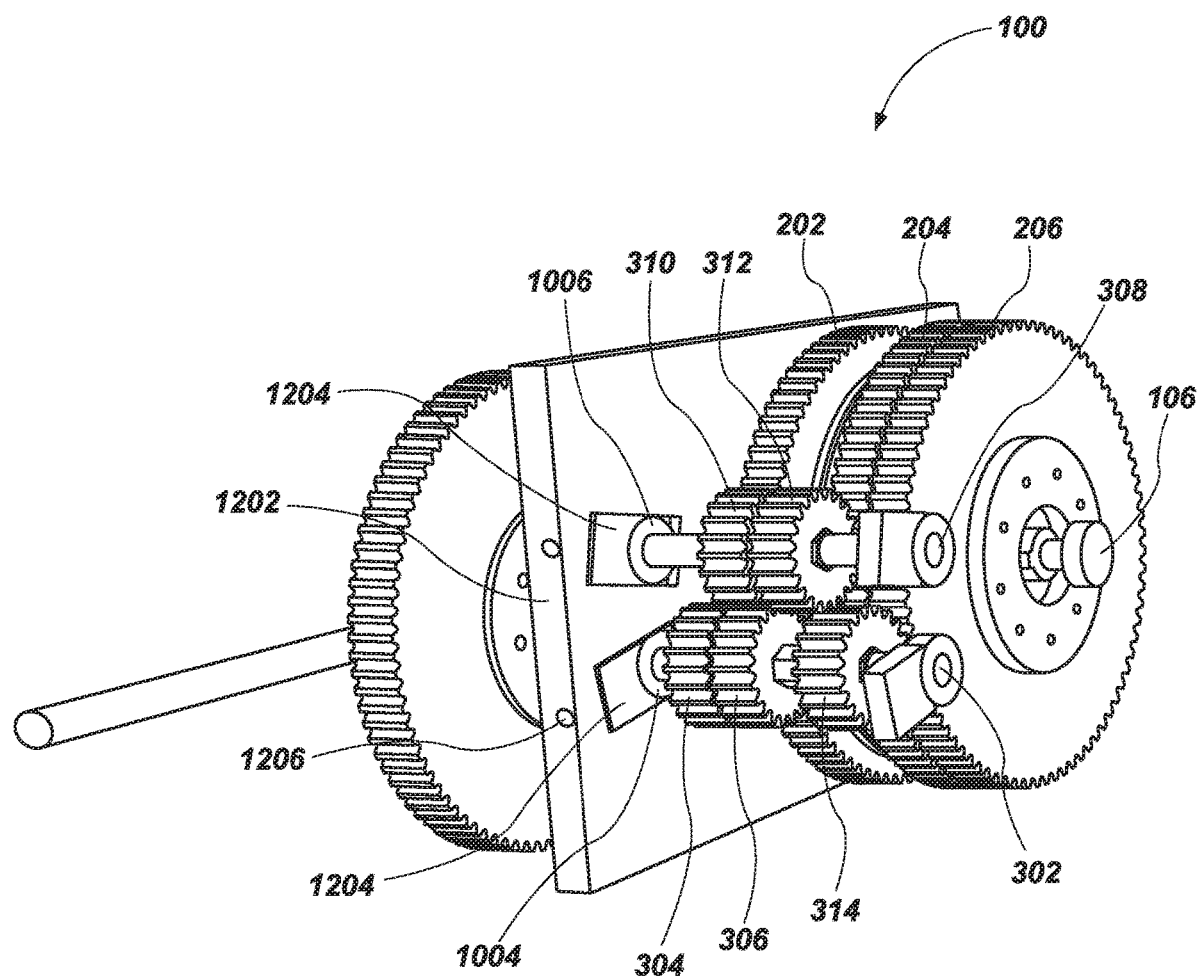
FIG. 12 illustrates a perspective view of the energy conversion apparatus of FIGS. 1-3 with covers removed in accordance with an embodiment of the present disclosure.

FIG. 12 illustrates the energy conversion apparatus 100 mounted to a side wall 1202 of the case 112. The side wall 1202 may include adjustment blocks 1204 configured to adjust a radial position of the first transmitting shaft 302 and/or second transmitting shaft 308 relative to the input shaft 106. For example, the adjustment blocks 1204 may provide tension on the first transmitting shaft bearings 1004 and the second transmitting shaft bearings 1006 in a radial direction toward the input shaft 106. The adjustment blocks 1204 may allow a radial position of the first transmitting shaft 302 and/or the second transmitting shaft 308 to be adjusted, after the energy conversion apparatus 100 has been assembled. For example, the radial position of the first transmitting shaft 302 and/or the second transmitting shaft 308 may be adjusted to account for wear on the associated gears 304, 306, 310, 312, 314 or wear on the first annular gear 202, second annular gear 204, or third annular gear 206.

The side wall 1202 may include adjustment passages 1206. The adjustment passages 1206 may allow an operator to access and/or adjust the adjustment blocks 1204. For example, the adjustment blocks 1204 may include tensioner hardware, such as set screws, screw tensioners, springs, etc. The adjustment passages 1206 may allow an operator to insert a tool to adjust the tensioner hardware. Thus, the radial tension on the first transmitting shaft 302 and/or the second transmitting shaft 308 may be adjusted through the adjustment passages 1206.

In some embodiments, the adjustment blocks 1204 may be self-adjusting. For example, the adjustment blocks 1204 may include a tension assembly configured to provide a constant pressure (e.g., radial force) on the first transmitting shaft bearing 1004 and/or the second transmitting shaft bearing 1006. The tension assembly may include elements such as one or more springs, a hydraulic pressure apparatus (e.g., cylinder, piston, fluid, etc.), configured to provide the constant radial pressure on the adjustment blocks 1204.

Embodiments of the present disclosure may include an energy conversion device for converting oscillating motion(s), such as vibrations, wave motions, etc. into rotational motion. For example, the input arm 102, 108 may capture oscillating motion and transmit the oscillating motion to the input shaft 106 as oscillating rotational motion. The oscillating rotational motion may be converted to single direction rotational motion for each of the annular gears 202, 204, 206. As described above, the second annular gear 204 may rotate in an opposite direction from the first annular gear 202 and the third annular gear 206 such that the relative rotational speed between the armature 702 of the second annular gear 204 and the plate magnets 402, 704 of the first annular gear 202 and the third annular gear 206 is greater. The rotation of the plate magnets 402, 704 relative to the armature 702 may generate electricity.

Embodiments of the present disclosure may allow smaller oscillations to generate energy by capturing energy from the motion in both directions such that a more constant rotation may be generated in the generator assembly 700. Thus, embodiments of the present disclosure may allow vibrations of a vehicle caused by imperfections in the traveling surface to be captured and generate electricity. Unlike available technologies for capturing energy from braking, which are only available for a short period of time when operating a vehicle (e.g., braking), embodiments of the present disclosure may allow a vehicle to capture electrical energy anytime the vehicle is moving.

Embodiments of the present disclosure may also improve efficiency of energy capture for larger oscillations. For example, tidal generators generally use waves to generate pressure in a hydraulic system and then power a pump with the pressurized hydraulic fluid to turn a generator. Significant amounts of energy are lost by converting the energy of the waves through the hydraulic systems. Embodiments of the present disclosure may allow the energy of the waves to be captured mechanically and converted directly into rotation of a generator. The mechanical conversion of the energy may be substantially more efficient. Thus, embodiments of the present disclosure may generate significantly more usable electrical energy from waves than conventional tidal generators.

Figure 13:
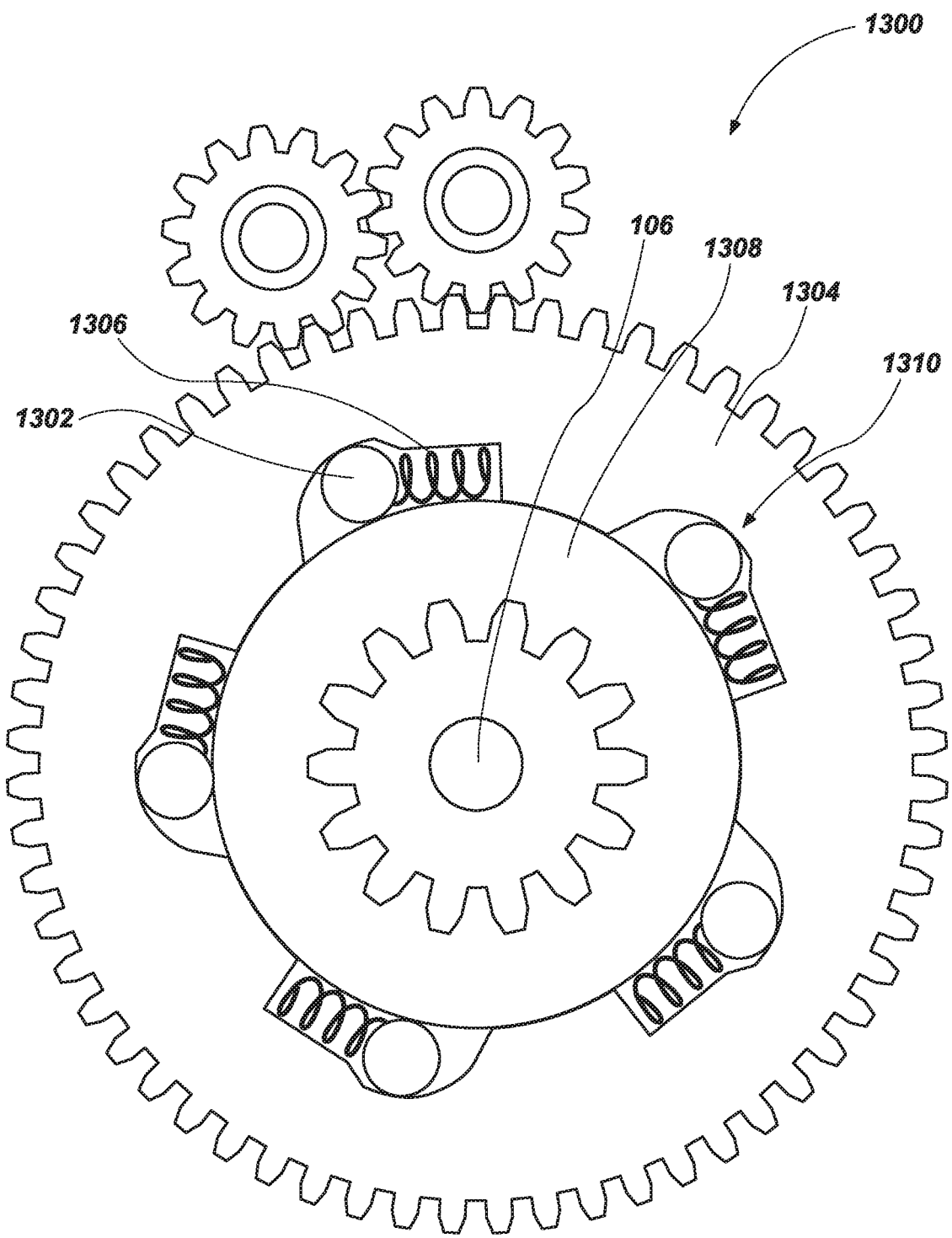
FIG. 13 illustrates a plan view of an annular gear assembly for use in the energy conversion apparatus of FIGS. 1-3 in accordance with an embodiment of the present disclosure.

FIG. 13 illustrates an embodiment of a first annular gear assembly 1300. The first annular gear assembly 1300 may include an input shaft 106, a first annular gear 1304, and a drive member 1308. The input shaft 106 may be coupled to the drive member 1308. In some embodiments, the drive member 1308 may include a cylindrical member (e.g., a disc).

The first annular gear 1304 may be disposed around a circumference of the drive member 1308. For example, the first annular gear 1304 and the drive member 1308 may be concentric and coaxial. Furthermore, the first annular gear 1304 may be fixed relative to the drive member 1308 when the drive member 1308 rotates in a first direction about a central axis of the input shaft 106 and may be free relative to the drive member 1308 when the drive member 1308 rotates in a second opposite direction. For example, in some embodiments, the first annular gear assembly 1300 may include a first set of linear bearings 1310 rotationally coupling the first annular gear 1304 to the drive member 1308. The first set of linear bearings 1310 may prevent rotation of the first annular gear 1304 relative to the drive member 1308 when the drive member 1308 is rotated in the first direction, and the first set of linear bearings 1310 may allow rotation of the first annular gear 1304 relative to the drive member 1308 when the drive member 1308 is rotated in the second opposite direction.

In some embodiments, each of the linear bearings of the first set of linear bearings 1310 may include a shell-type roller clutch. For example, each linear bearing of the first set of linear bearings 1310 may include a roller 1302 and a spring 1306. The roller 1302 may be configured to wedge between the first annular gear 1304 and the drive member 1308 when the drive member 1308 is rotated in the first direction to prevent rotation of the first annular gear 1304 relative to the drive member 1308. For example, positive wedge forces may substantially prevent rotation of the first annular gear 1304 relative to the drive member 1308. The spring 1306 may hold the roller 1302 in place for at least substantially instantaneous lock-up when the drive member 1308 is rotated in the first direction. Furthermore, the roller 1302 may operate as a bearing and may allow rotation of the first annular gear 1304 relative to the drive member 1308 when the drive member 1308 is rotated in the second opposite direction. For example, the roller 1302 may allow the first annular gear 1304 to overrun the drive member 1308 freely when the drive member 1308 is rotated in the second opposite direction.

Figure 14:
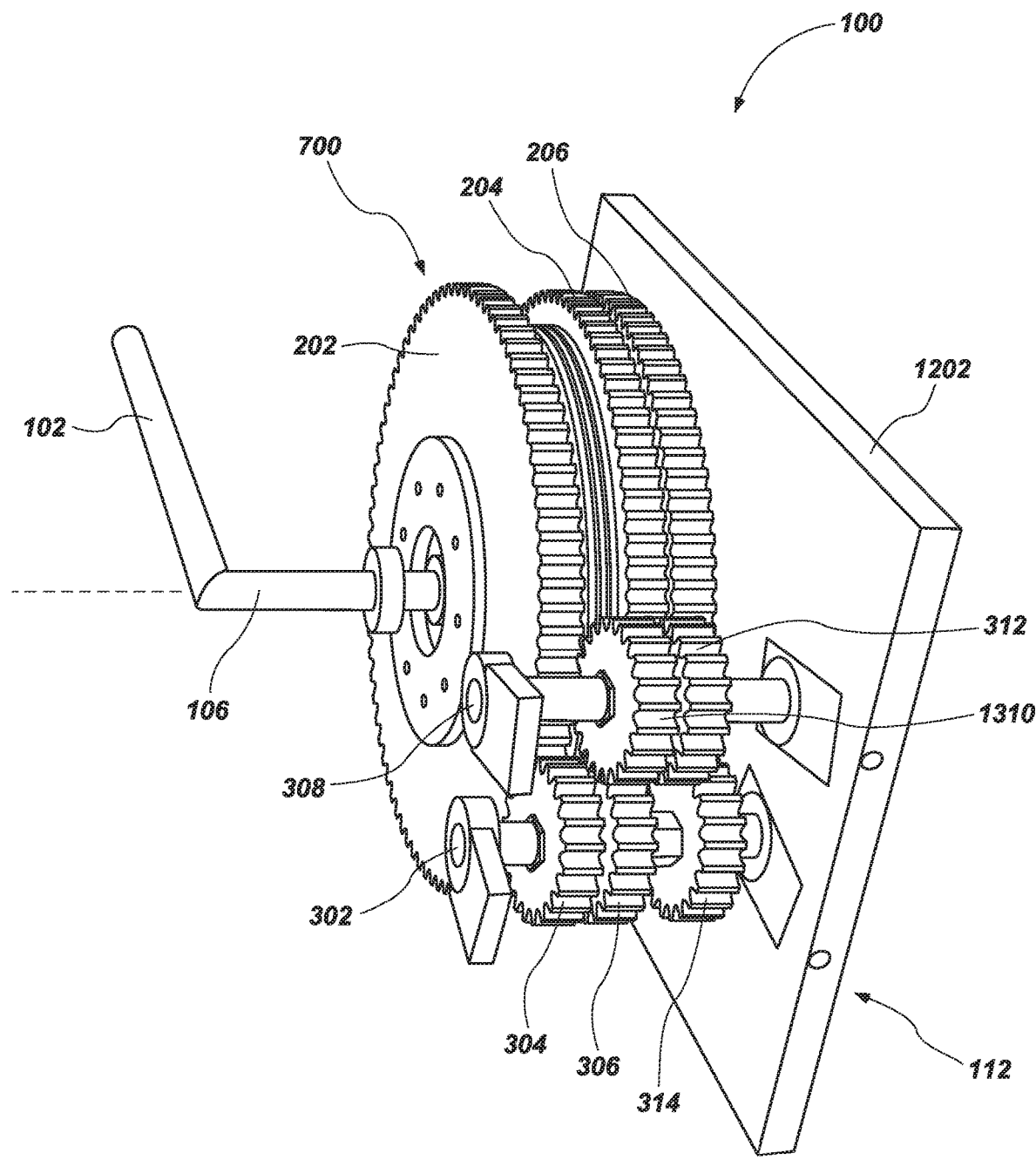
FIG. 14 illustrates another perspective view of the energy conversion apparatus of FIGS. 1-3 with covers removed in accordance with an embodiment of the present disclosure.

FIG. 14 illustrates an embodiment of an energy conversion apparatus 100 with several walls of the case 112 removed to view the internal components, such as the generator assembly 700, first transmitting shaft 302, and the second transmitting shaft 308. In some embodiments, rotational motion may be input into the input shaft 106 directly from an input arm 102. For example, the input arm 102 may be coupled to an oscillation component, such as a suspension arm on a vehicle. In some embodiments, the input arm 102 may be an oscillating component, such as the suspension arm of the vehicle.

The energy conversion apparatus 100 may capture the motion of the suspension arm of the vehicle and convert the motion to electricity. In some embodiments, the electricity may be used to power on-board electronics, such as a stereo, an infotainment system, lights, etc. For example, the electricity generated by the energy conversion apparatus 100 may reduce electrical power drawn from the vehicle battery while the vehicle is in motion. In some embodiments, the electricity generated by the energy conversion apparatus 100 may be used to charge a rechargeable battery of the vehicle (e.g., an electric or hybrid vehicle).

Generating power from vibrations of the vehicle may reduce draw on the vehicle battery and may reduce fuel consumption. In some embodiments, such as hybrid-electric vehicles, generating power from vibrations may extend the time a vehicle can operate in an electric only mode or in a reduced engine capacity mode increasing fuel efficiency of the vehicle. For example, hybrid-electric vehicles generally are more fuel efficient in stop and go or city traffic rather than at highway or freeway speeds, due at least in part to the ability of hybrid-electric vehicles to capture energy from braking. Capturing energy from vibrations may allow a hybrid-electric vehicle to capture energy efficiently at highway speeds increasing fuel efficiency at highway speeds where many vehicles are operated for longer periods of time and over greater distances. In fully electric vehicles, generating power from vibrations of the vehicle may increase a range of the vehicle and/or extend operating time for a battery.

Figure 15:
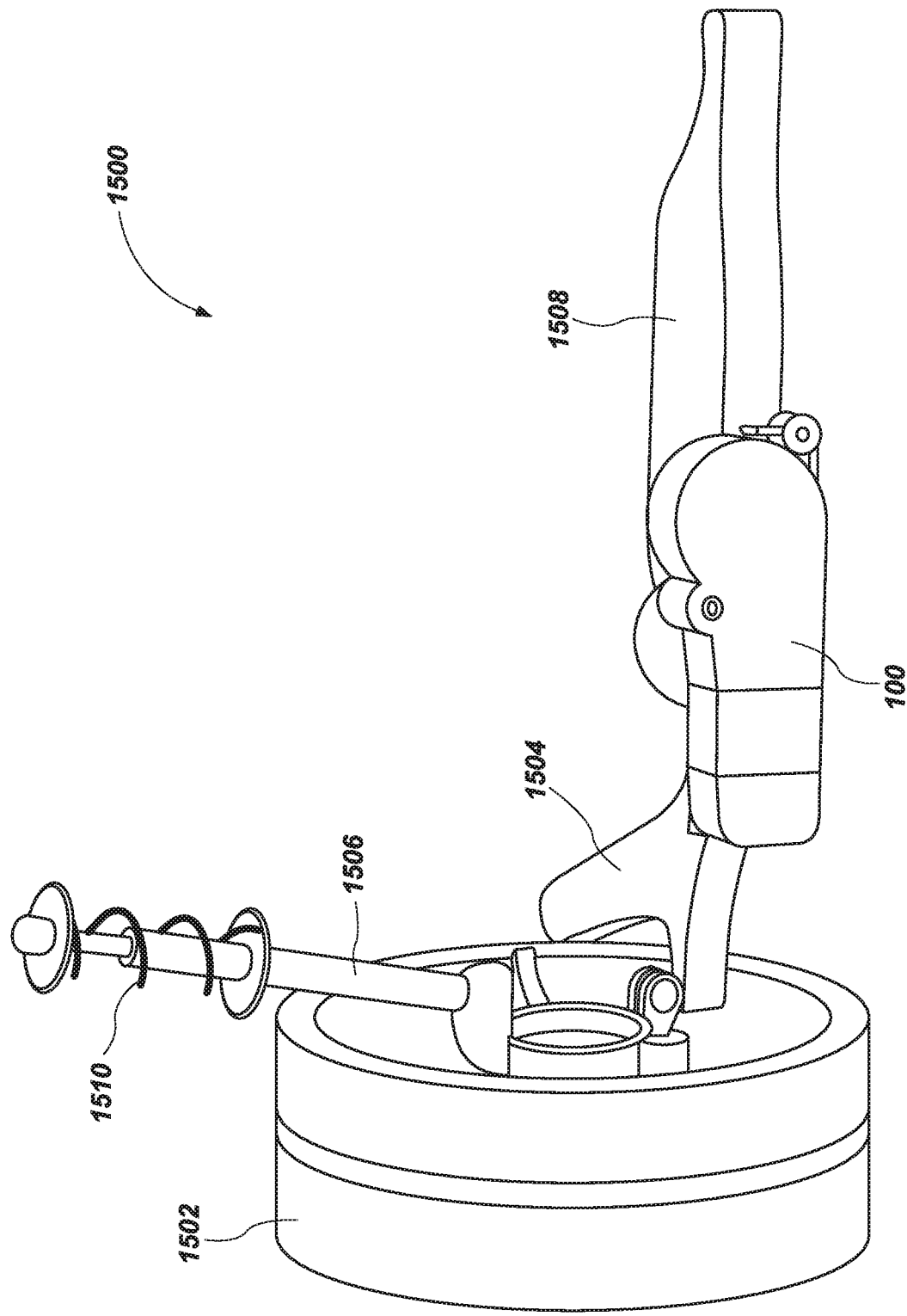
FIG. 15 illustrates a suspension system including an embodiment of the energy conversion apparatus of FIGS. 1-3 with covers removed in accordance with an embodiment of the present disclosure.

FIG. 15 illustrates an embodiment of the energy conversion apparatus 100 incorporated into an automotive suspension system 1500. The suspension system 1500 may include a suspension arm 1504 coupled between a frame 1508 and a wheel 1502. The suspension system 1500 may further include a spring 1510 and an extendable arm 1506.

The frame 1508 may be fixed relative to the associated vehicle. The suspension arm 1504 may be configured rotate relative to the frame 1508 such that the wheel 1502 may travel vertically relative to the frame 1508. In some embodiments, the suspension arm 1504 may be coupled to the input arm 102 of the energy conversion apparatus 100. In some embodiments, the suspension arm 1504 may be coupled directly to the input shaft 106 of the energy conversion apparatus 100, such that the suspension arm 1504 may act as the input arm 102 of the energy conversion apparatus 100. In some embodiments, the suspension arm 1504 may be coupled to the input shaft 106 through an input gear 104.

As the wheel 1502 moves in an upward direction the suspension arm 1504 may cause the input shaft 106 to rotate in a first direction. As the wheel 1502 moves in a downward direction the suspension arm 1504 may cause the input shaft 106 to rotate in a second direction. As described above, the energy conversion apparatus 100 may be configured to convert the alternating directions of rotation into single direction rotation of the generator assembly 700. The generator assembly 700 may be configured to generate electrical power when the generator assembly 700 rotates. In a vehicle, the power output from the generator assembly 700 may be coupled to a power storage device, such as a battery, battery bank, battery cell, etc.

In some embodiments, the extendable arm 1506 may include a dampening feature (e.g., shock absorber, strut, hydraulic damper, etc.). In some embodiments, resistance to the motion provided by the generator assembly 700 may provide dampening for the suspension system 1500 and the extendable arm 1506 may position a top portion of the wheel 1502. In some embodiments, the suspension system 1500 may include an upper and a lower suspension arm 1504, such as a double wishbone suspension system. In some embodiments, the suspension system 1500 may not include the extendable arm 1506. For example, in a double wishbone suspension the damping effect may be provided through the energy conversion apparatus 100 and the wheel 1502 may be positioned through the upper and lower suspension arm 1504.

Figure 16:
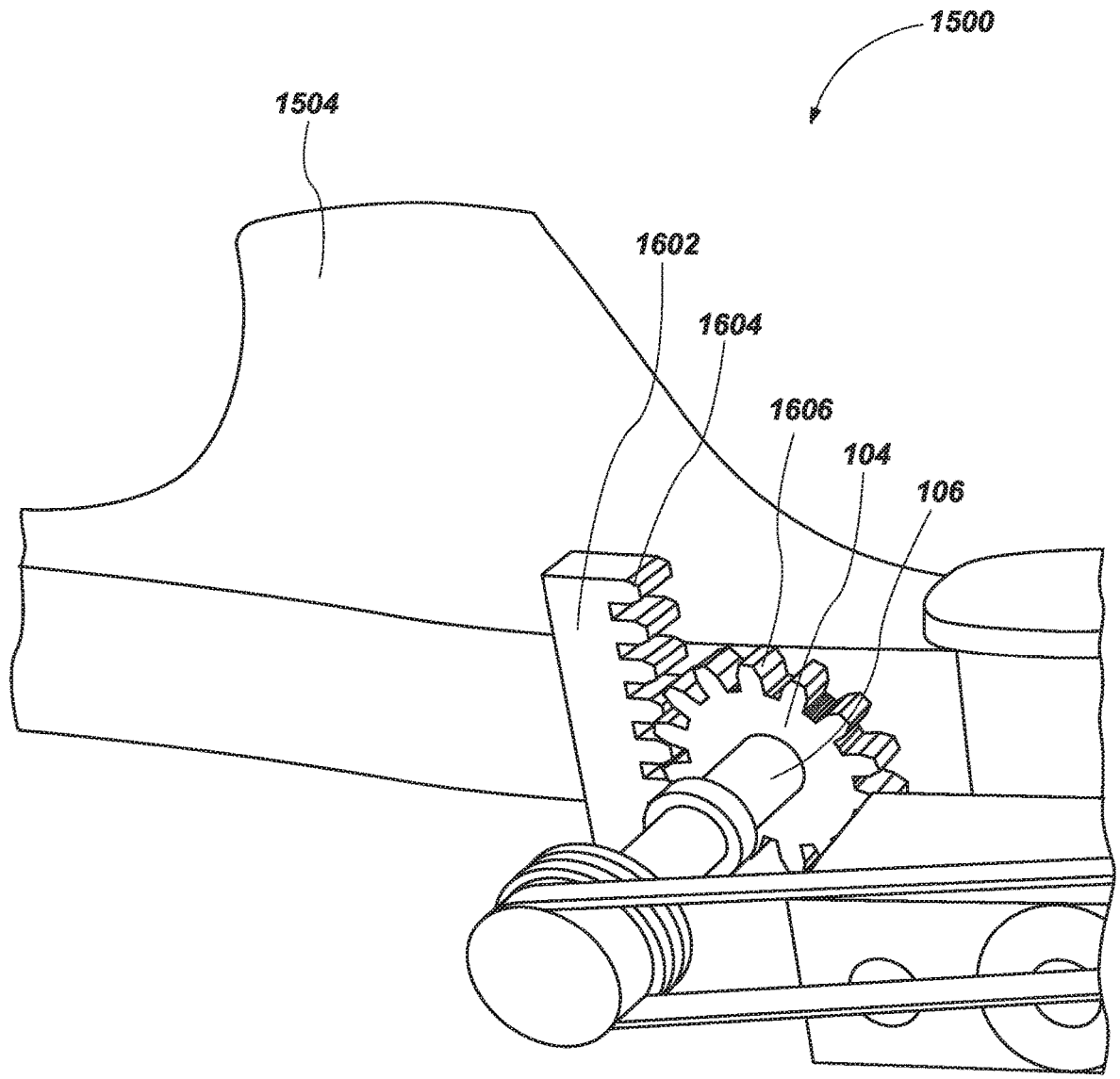
FIG. 16 illustrates an enlarged view of an embodiment of the suspension system of FIG. 15 in accordance with an embodiment of the present disclosure.

FIG. 16 illustrates an embodiment of the suspension system 1500. The suspension arm 1504 may input rotational motion to the input shaft 106 of the energy conversion apparatus 100 through the input gear 104. For example, the suspension arm 1504 may include a linear gear 1602 coupled to the suspension arm 1504. The linear gear 1602 may include multiple teeth 1604. The teeth 1604 of the linear gear 1602 may be configured to operatively engage teeth 1606 of the input gear 104 creating a rack and pinion engagement, wherein the rack corresponds to the linear gear 1602 and the pinion gear corresponds to the input gear 104.

As the suspension arm 1504 moves radially with the vertical movement of the wheel 1502, the linear gear 1602 may cause the input gear 104 to rotate. The input gear 104 may be coupled to the input shaft 106, such that rotation of the input gear 104 is transmitted to the energy conversion apparatus 100 through the input shaft 106.

Figure 17:
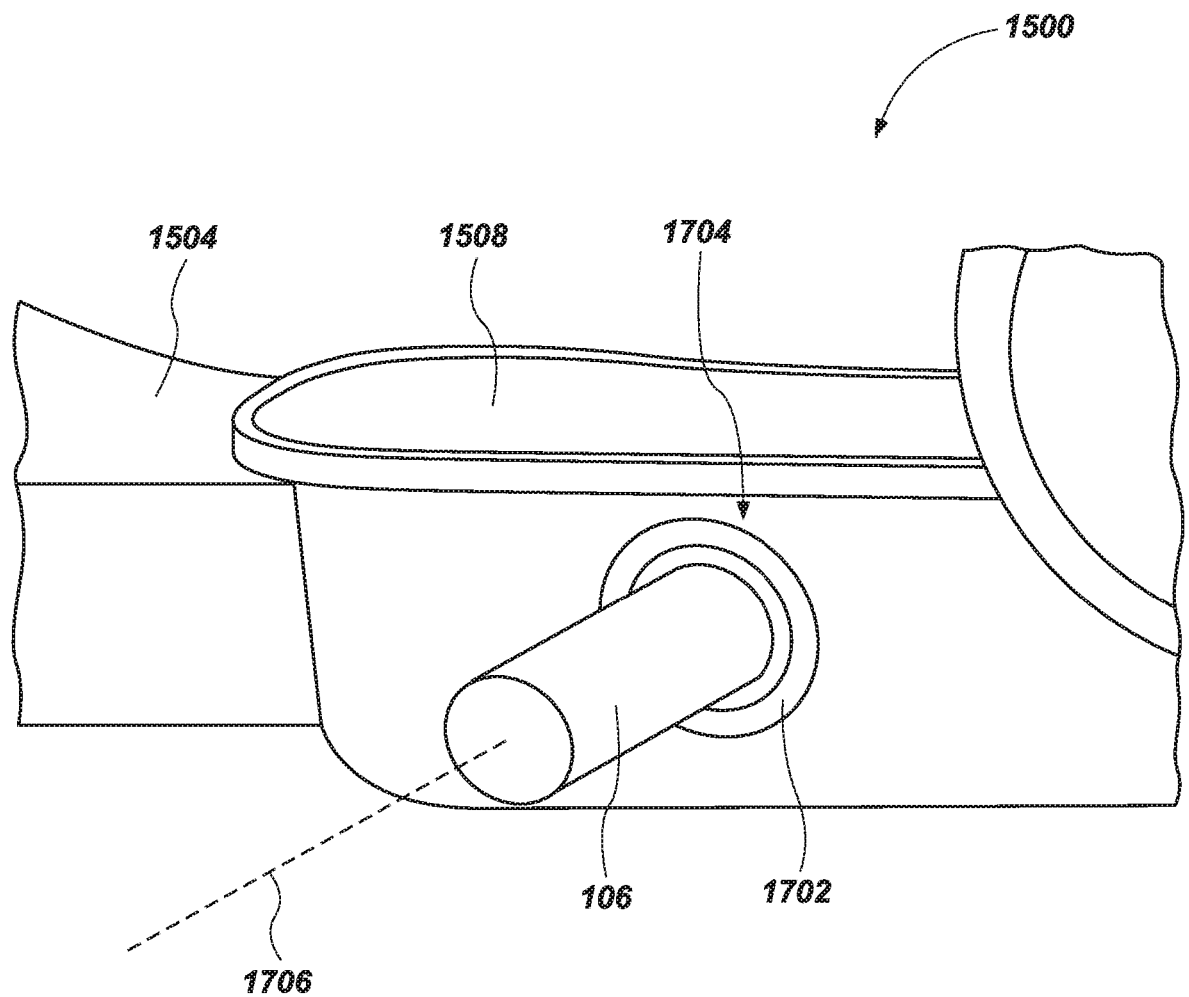
FIG. 17 illustrates an enlarged view of an embodiment of the suspension system of FIG. 15 in accordance with an embodiment of the present disclosure.

FIG. 17 illustrates an embodiment of the suspension system 1500. In some embodiments, the suspension arm 1504 may be coupled directly to the input shaft 106. For example, the input shaft 106 may pass through a bushing 1702 in the frame 1508. The bushing 1702 may be positioned at a coupling point 1704, where the suspension arm 1504 is coupled to the frame 1508. The suspension arm 1504 may rotate relative to the frame 1508 about an axis 1706. The input shaft 106 may be arranged to be coaxial with the axis 1706 of rotation of the suspension arm 1504, such that as the suspension arm 1504 rotates the suspension arm 1504 may rotate the input shaft 106. The input shaft 106 may transmit the motion of the suspension arm 1504 to the energy conversion apparatus 100 that may convert the motion into electrical power as described above.

Figure 18:
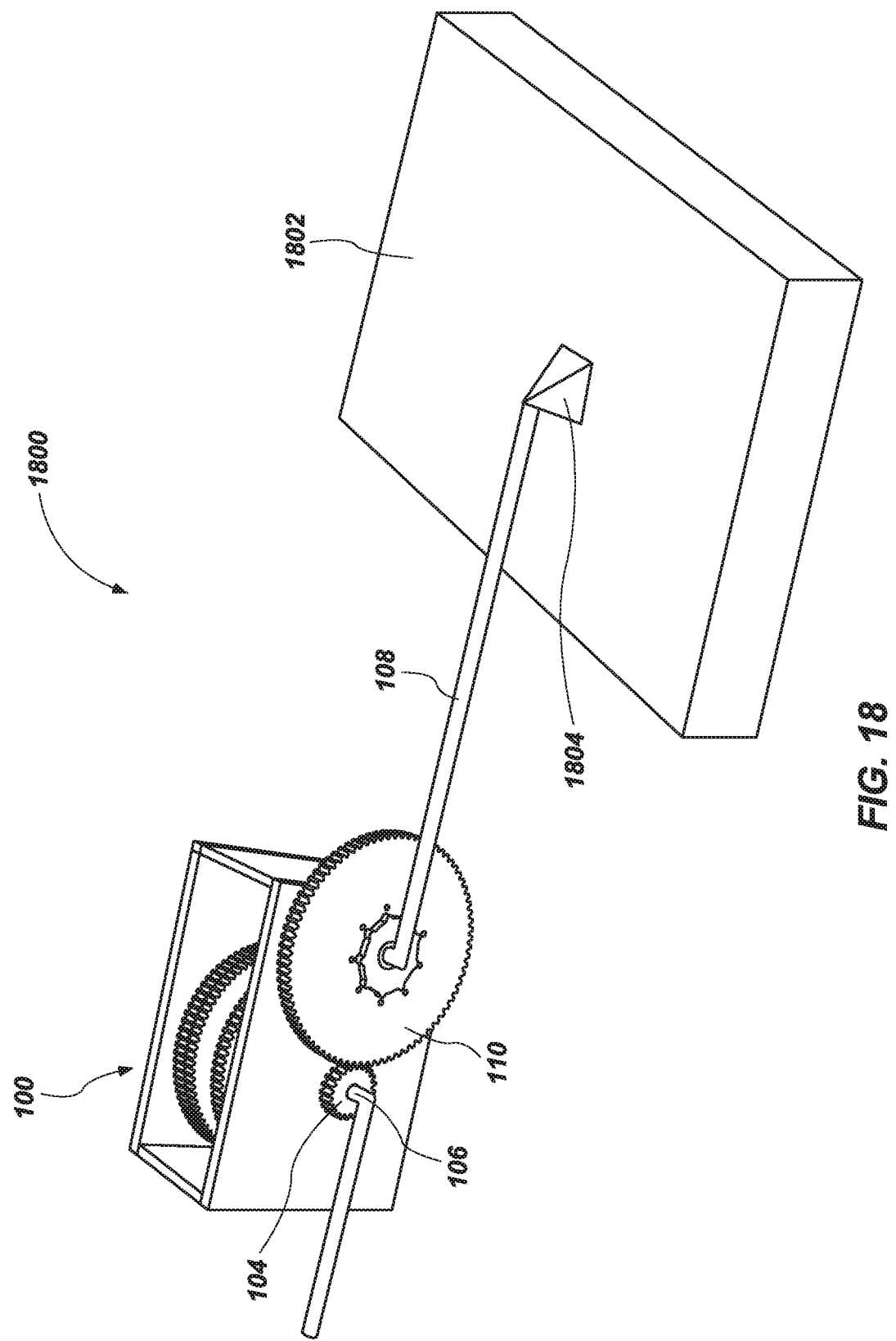
FIG. 18 illustrates an embodiment of a tidal generator including an embodiment of the energy conversion apparatus of FIGS. 1-3 with covers removed in accordance with an embodiment of the present disclosure.

FIG. 18 illustrates a tidal generator 1800 including the energy conversion apparatus 100. The tidal generator 1800 may include a float 1802 coupled to the input arm 108 of the energy conversion apparatus 100 through a coupling arm 1804. In some embodiments, the coupling arm 1804 may be configured to allow the float 1802 to rotate relative to the input arm 108, such as through one or more joints (e.g., ball joint, rod end bearings, rose joint, heim joint, etc.). In some embodiments, vertical movement of the float 1802 may be transmitted to the input arm 108, such that the input arm 108 may rotate relative to the energy conversion apparatus 100. The input arm 108 may be coupled to a multiplier gear 110. The multiplier gear 110 may be operatively engaged with the input gear 104. For example, teeth of the multiplier gear 110 may be engaged with teeth of the input gear 104 such that rotation of the multiplier gear 110 may be transmitted to the input gear 104 through the engagement between the teeth of the multiplier gear 110 and the input gear 104.

The float 1802 may move vertically with waves in a body of water (e.g., ocean, sea, lake, river, etc.). In some embodiments, the waves may create large amounts of force. In some embodiments, the waves may move the float 1802 relatively slowly as compared with the movement of the car suspension described above with respect to FIG. 15. The multiplier gear 110 may allow a slower movement of the waves to rotate the input shaft 106 at a higher speed. For example, as a diameter of the multiplier gear 110 increases a tangential velocity of the teeth of the multiplier gear 110 may increase. The tangential velocity may be transferred to the teeth of the smaller input gear 104. The smaller input gear 104 may rotate at a higher rotational velocity than the multiplier gear 110 to maintain the same tangential velocity of the teeth of the multiplier gear 110.

As the waves move the float 1802 vertically up and down in an undulating or oscillating motion, the input arm 108 may rotate the multiplier gear 110 in a first direction and/or a second direction responsive to the motion of the float 1802. The multiplier gear 110 may transmit the rotational motion to the input gear 104 through the teeth of the multiplier gear 110 and the input gear 104. The input gear 104 may then transmit the rotational motion to the energy conversion apparatus 100 through the input shaft 106. As described above, the energy conversion apparatus 100 may then convert the oscillating rotation of the input shaft 106 to electrical power through the generator assembly 700.

Figure 19:
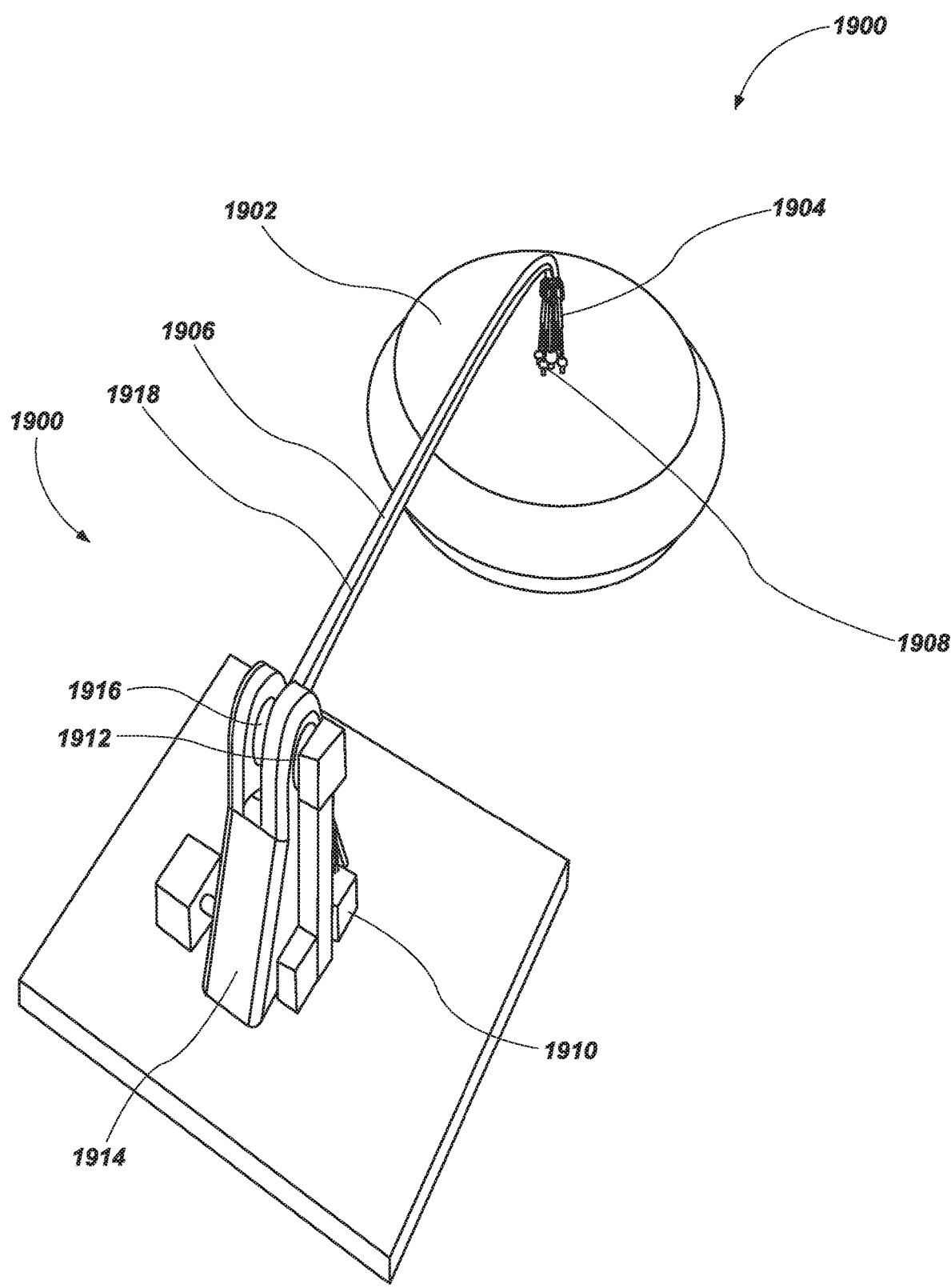
FIGS. 19 and 20 illustrate an embodiment of a wave motion harnessing device including embodiments of the energy conversion apparatus of FIGS. 1-3 in accordance with an embodiment of the present disclosure.
Figure 20:
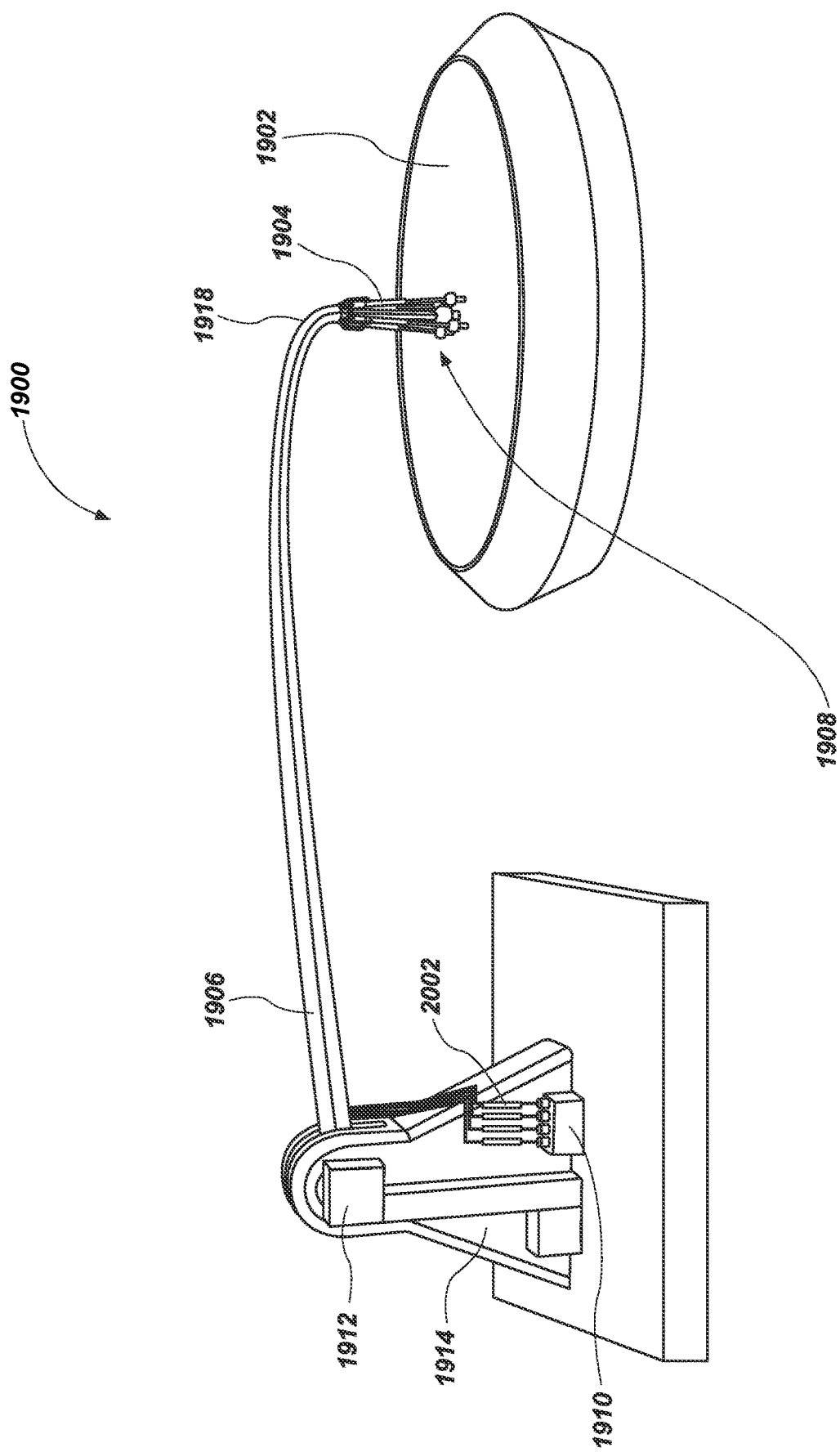
Figure 21:
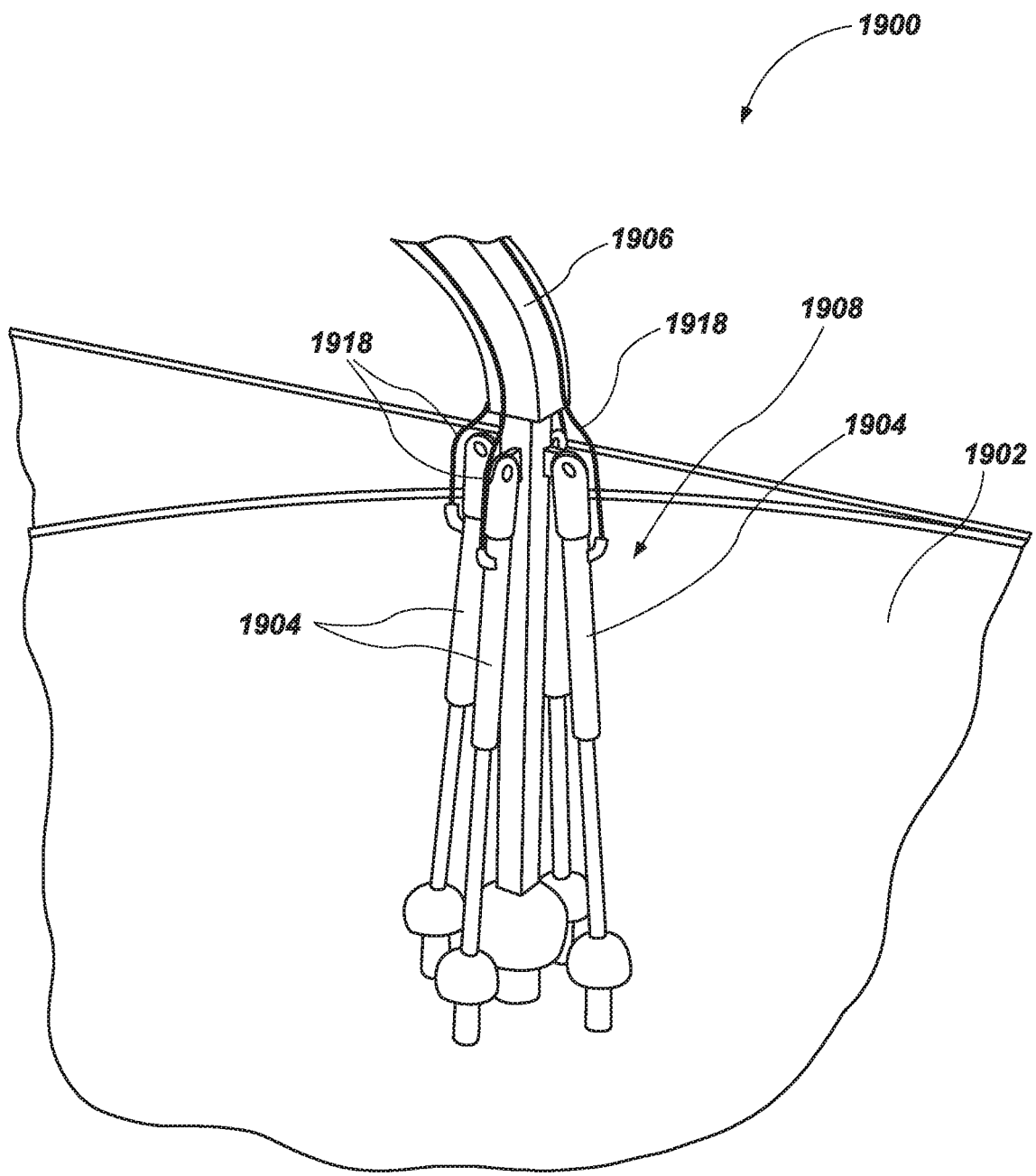
FIG. 21 illustrates an enlarged view of a portion of the wave motion harnessing device of FIGS. 19 and 20 in accordance with an embodiment of the present disclosure.

FIGS. 19, 20 and 21 show views of a wave motion harnessing device 1900 according to one or more embodiments of the present disclosure. The wave motion harnessing device 1900 may include a float 1902, a lever arm 1906, a base system 1914, a plurality of hydraulic assemblies 1908, and a plurality of energy conversion hydraulic assemblies 1908. The lever arm 1906 may be rotatably coupled to the base system 1914 and may be connected to the float 1902 such that waves may cause the float 1902 to rise and fall and, as a result, the lever arm 1906 to rotate about the base system 1914. The lever arm 1906 may be engaged with an input shaft 1916 of an energy conversion apparatus 1912. In some embodiments, the lever arm 1906 may be engaged with one or more hydraulic assemblies 1908.

In some embodiments, each of the plurality of hydraulic assemblies 1908 may include a hydraulic line 1918 and hydraulic operated pistons 1904 on each end of the hydraulic lines 1918. One piston 1904 and one end of the hydraulic line 1918 may be connected to the float 1902, and another piston 1904 and another end of the hydraulic line 1918 may be connected to the base system 1914 and may be engaged with an input shaft, input gear, multiplier gear, etc. of one or more of the energy conversion apparatuses 1910. Furthermore, the energy conversion apparatuses 1910 may operate via any of the manners described above in regard to FIGS. 1-14.

In some embodiments, the plurality of hydraulic assemblies 1908 may be connected to the float 1902 in a diamond pattern centered about the lever arm 1906. In operation, wave shapes may cause the float 1902 to tilt and may cause the pistons 1904 to push and pull hydraulic fluid within the hydraulic lines 1918. Pushing and pulling the hydraulic fluid within the hydraulic lines 1918 may cause pistons 2002 at the base system 1914 to move an input arm, input gear and/or input shaft of one or more of the energy conversion apparatuses 1910.

The wave motion harnessing device 1900 may capture the main vertical oscillations of the waves through the lever arm 1906 and convert the motion to electrical energy through the energy conversion apparatus 1912 coupled to the lever arm 1906 through the input shaft 1916. Furthermore, the wave motion harnessing device 1900 may also capture minor oscillations or undulations of the waves that cause the float 1902 to pivot relative to the lever arm 1906 through the hydraulic assemblies 1908 and convert the motion to electrical energy through the energy conversion apparatuses 1910 coupled to the hydraulic lines 1918.

Capturing both the main vertical oscillations of the waves and the minor oscillations or undulations of the waves may increase the electrical energy generated by a single wave motion harnessing device 1900. Increasing the energy generated by the wave motion harnessing device 1900 may increase the amount of renewable energy available and reduce a dependence on other forms of energy. Further increasing the energy generated by the wave motion harnessing device 1900 may reduce the number of wave motion harnessing device 1900 needed in any given area reducing an environmental impact of the wave motion harnessing device 1900 and the effects that the wave motion harnessing device 1900 may have on wildlife in an area around the wave motion harnessing device 1900.

Embodiments of the present disclosure include the following embodiments:

Embodiment 1: An energy conversion assembly, comprising: a frame member; an input shaft coupled to a control arm, wherein the control arm is configured to move relative to the frame member; a first annular gear coupled to the input shaft through a first direction limiting device; wherein the first direction limiting device is configured to allow rotation of the first annular gear in a first direction and substantially inhibit rotation of the first annular gear in a second direction; a second annular gear coupled to the input shaft through a second direction limiting device; wherein the second direction limiting device is configured to allow rotation of the second annular gear in the second direction and substantially inhibit rotation of the second annular gear in the first direction; a first transmitting gear engaged with the first annular gear; a second transmitting gear engaged with the second annular gear; a conversion gear operatively coupled to the second transmitting gear; and a transmitting shaft coupled to the first transmitting gear and the conversion gear.

Embodiment 2. The energy conversion assembly of embodiment 1, wherein the input arm is a suspension arm of a vehicle.

Embodiment 3. The energy conversion assembly of embodiment 2, wherein the energy conversion assembly is configured to dampen oscillation of a suspension of the vehicle by generating electricity.

Embodiment 4. The energy conversion assembly of any of embodiments 1-3, wherein at least one of the first direction limiting device and the second direction limiting device comprises a one-way bearing.

Embodiment 5. The energy conversion assembly of any of embodiments 1-4, wherein the first annular gear comprises a plate magnet.

Embodiment 6. The energy conversion assembly of any of embodiments 1-5, wherein the second annular gear comprises an armature.

Embodiment 7. The energy conversion assembly of either of embodiments 5 or 6, wherein the plate magnet comprises a plurality of permanent magnets.

Embodiment 8. The energy conversion assembly of embodiment 7, wherein the plurality of permanent magnets are arranged radially about a central axis of the plate magnet.

Embodiment 9. The energy conversion assembly of either of embodiments 7 or 8, wherein the plate magnet further comprises a ferromagnetic core.

Embodiment 10. The energy conversion assembly of any of embodiments 1-9, further comprising at least one adjustment block configured to adjust a radial position between the transmitting shaft and the input shaft.

Embodiment 11. A tidal generator comprising: a float; a multiplier gear operatively coupled to the float; an input gear operatively engaged with the multiplier gear; the input gear operatively coupled to an input shaft; a first annular gear coupled to the input shaft through a first one way bearing; wherein the first one way bearing is configured to allow rotation of the first annular gear in a first direction and substantially inhibit rotation of the first annular gear in a second direction; a second annular gear coupled to the input shaft through a second one way bearing; wherein the second one way bearing is configured to allow rotation of the second annular gear in the second direction and substantially inhibit rotation of the second annular gear in the first direction; a first transmitting gear engaged with the first annular gear; a second transmitting gear engaged with the second annular gear; a conversion gear operatively coupled to the second transmitting gear; and a transmitting shaft coupled to the first transmitting gear and the conversion gear.

Embodiment 12. The tidal generator of embodiment 11, wherein the first annular gear comprises a plate magnet configured to rotate with the first annular gear.

Embodiment 13. The tidal generator of embodiment 12, wherein the second annular gear comprises an armature configured to rotate with the second annular gear.

Embodiment 14. The tidal generator of embodiment 13, wherein the armature comprises a plurality of coils.

Embodiment 15. The tidal generator of embodiment 14, wherein the plurality of coils are arranged radially about a central axis of the second annular gear.

Embodiment 16. The tidal generator of either of embodiments 14 or 15, wherein the plurality of coils are formed from a conductive material.

Embodiment 17. The tidal generator of any of embodiments 14-16, wherein the plurality of coils are coupled to one or more transmission rings.

Embodiment 18. The tidal generator of embodiment 17, wherein the one or more transmission rings are configured to provide power to an external component through brushes.

Embodiment 19. The tidal generator of any of embodiments 11-18, further comprising: a lever arm operatively coupled between the float and the multiplier gear; at least one hydraulic assembly coupled to the float; and at least one energy conversion apparatus coupled to the at least one hydraulic assembly; wherein the float is configured to pivot relative to the lever arm and the at least one hydraulic assembly is configured to transmit motion caused by the float pivoting relative to the lever arm to the at least one energy conversion apparatus and the at least one energy conversion apparatus is configured to convert the motion to electrical energy.

Embodiment 20. An electric generator comprising: an input gear operatively coupled to an input shaft; an oscillating member operatively coupled to the input gear; a first annular gear coupled to the input shaft through a first one way bearing; wherein the first one way bearing is configured to allow rotation of the first annular gear in a first direction and substantially inhibit rotation of the first annular gear in a second direction; at least one magnet coupled to the first annular gear and configured to rotate with the first annular gear; a second annular gear coupled to the input shaft through a second one way bearing; wherein the second one way bearing is configured to allow rotation of the second annular gear in the second direction and substantially inhibit rotation of the second annular gear in the first direction; an armature coupled to the second annular gear and configured to rotate with the second annular gear; a first transmitting gear engaged with the first annular gear; a second transmitting gear engaged with the second annular gear; a conversion gear operatively coupled to the second transmitting gear; and a transmitting shaft coupled to the first transmitting gear and the conversion gear.

The embodiments of the present disclosure may allow oscillating motion to be captured and converted into electrical energy. Capturing oscillating motion may allow more energy to be generated from naturally occurring phenomenon such as tides, waves, wind, etc. Capturing oscillating motion may also reduce kinetic energy losses due to mechanical movement, such as automotive suspensions, structural movement, etc. Capturing oscillating motion may allow more clean energy sources to be developed and increase the efficiency of operating systems, such as hybrid electric vehicles.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An energy conversion device, comprising:
    an input shaft;
    a first input arm operably coupled to the input shaft and configured to rotate the input shaft in at least one first direction;
    a second input arm operably coupled to the input shaft through a multiplier gear and configured to rotate the input shaft in at least one second direction independent of the first input arm and at a different rate from the first input arm;
    a first one-way bearing coupled to the input shaft and configured to allow rotation of the first one-way bearing about the input shaft in a first direction;
    a plate magnet coupled to the input shaft, wherein rotation of the plate magnet is controlled via the first one-way bearing, the plate magnet comprising a plurality of permanent magnets disposed radially about a core;
    a second one-way bearing coupled to the input shaft and configured to allow rotation of the second one-way bearing about the input shaft in a second direction; and
    an armature coupled to the input shaft, wherein rotation of the armature is controlled via the second one-way bearing, the armature comprising a plurality of coils.

2. The energy conversion device of claim 1, the plate magnet and the armature form at least a portion of a generator.

3. The energy conversion device of claim 1, further comprising a mounting structure configured for mounting the energy conversion device to a frame member.

4. The energy conversion device of claim 1, wherein the first input arm is coupled to a suspension arm of a vehicle.

5. The energy conversion device of claim 1, wherein the plurality of permanent magnets are arranged radially about a central axis of the plate magnet.

6. The energy conversion device of claim 1, wherein the core of the plate magnet comprises a ferromagnetic core.

7. The energy conversion device of claim 1, wherein the at least one second input arm is coupled to a vehicle.

8. The energy conversion device of claim 1, wherein the plurality of coils are arranged radially about a central axis of the armature.

9. The energy conversion device of claim 1, wherein the plurality of coils are formed from a conductive material.

10. The energy conversion device of claim 1, wherein the plurality of coils are coupled to one or more transmission rings.

11. The energy conversion device of claim 10, wherein the one or more transmission rings are configured to provide power to an external component through brushes.

12. A method, comprising:
    rotating an input shaft in a first direction through a first input arm coupled to a first moving component;
    causing a plate magnet coupled to the input shaft to rotate in the first direction and relative to an armature coupled to the input shaft, the plate magnet comprising a plurality of permanent magnets disposed radially about a core and the armature comprising a plurality of coils;
    rotating the input shaft in a second direction through a second input arm coupled to a second moving component, the second input arm rotating independent of the first input arm, wherein at least one of the first input arm and the second input arm are coupled to the input shaft through a multiplier gear where the second input arm rotates the input shaft at a second rate different from a first rate of the first input arm; and
    causing the armature to rotate in the second direction and relative to the plate magnet.

13. The method of claim 12, wherein rotating the plate magnet in the first direction is at least partially achieved by rotating a first one-way bearing coupled to the input shaft.

14. The method of claim 12, wherein rotating the armature in the second direction is at least partially achieved by rotating a second one-way bearing coupled to the input shaft.

* * * * *

UNITED STATES PATENT AND TRADEMARK OFFICE
CERTIFICATE OF CORRECTION

| | | |
|---|---|---|
| PATENT NO. | : 12,155,271 B2 | Page 1 of 1 |
| APPLICATION NO. | : 17/441166 | |
| DATED | : November 26, 2024 | |
| INVENTOR(S) | : Vardan Verdyan et al. | |

It is certified that error appears in the above-identified patent and that said Letters Patent is hereby corrected as shown below:

In the Claims

Claim 7,    Column 28,    Lines 3-4,    change "wherein the at least one second input" to --wherein the second input--

Signed and Sealed this
Fourth Day of February, 2025

Coke Morgan Stewart
*Acting Director of the United States Patent and Trademark Office*